(12) United States Patent
Cho et al.

(10) Patent No.: US 12,386,244 B2
(45) Date of Patent: Aug. 12, 2025

(54) IMAGING METHOD AND DEVICE FOR AUTOFOCUSING

(71) Applicant: SAMSUNG ELECTRONICS CO., LTD., Suwon-si (KR)

(72) Inventors: Yang Ho Cho, Suwon-si (KR); Juyong Park, Suwon-si (KR); Jingu Heo, Suwon-si (KR); Dong Kyung Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 18/121,323

(22) Filed: Mar. 14, 2023

(65) Prior Publication Data

US 2024/0111203 A1 Apr. 4, 2024

(30) Foreign Application Priority Data

Sep. 30, 2022 (KR) .................. 10-2022-0125759

(51) Int. Cl.
*G03B 13/36* (2021.01)
*G02B 3/00* (2006.01)
*G03B 3/10* (2021.01)

(52) U.S. Cl.
CPC ........... *G03B 13/36* (2013.01); *G02B 3/0075* (2013.01); *G03B 3/10* (2013.01)

(58) Field of Classification Search
CPC .................................................. H04N 13/271
See application file for complete search history.

(56) References Cited

U.S. PATENT DOCUMENTS

| 7,262,799 B2 * | 8/2007 | Suda ................ H04N 23/843 348/273 |
| 10,025,162 B2 | 7/2018 | Watanabe et al. |

(Continued)

FOREIGN PATENT DOCUMENTS

| CN | 102783162 A * | 11/2012 | ............. G03B 35/08 |
| JP | 2011-118235 A | 6/2011 | |

(Continued)

OTHER PUBLICATIONS

Extended European Search Report dated Feb. 22, 2024, issued by European Patent Office in European Patent Application No. 23181180.3.

*Primary Examiner* — Cynthia Segura
(74) *Attorney, Agent, or Firm* — Sughrue Mion, PLLC

(57) ABSTRACT

An imaging device includes an imaging lens array including a plurality of imaging lenses each with a same focal length, the plurality of imaging lenses being configured to capture a scene; a sensing array comprising a plurality of sensors configured to receive light passing through the plurality of imaging lenses; a processor configured to determine a scene depth plane corresponding to the scene based on a comparison, for each of a plurality of candidate depths, between reference pixel values based on first sensors of the plurality of sensors corresponding to a reference imaging lens of the plurality of imaging lenses and target pixel values that are based on second sensors of the plurality of sensors corresponding to a target imaging lens of the plurality of image lenses; and a lens driver configured to position the imaging lens array to be disposed at a point corresponding to the scene depth plane.

20 Claims, 14 Drawing Sheets

(56) References Cited

U.S. PATENT DOCUMENTS

| | | | |
|---|---|---|---|
| 2013/0070060 A1* | 3/2013 | Chatterjee | H04N 23/45 |
| | | | 348/47 |
| 2015/0279056 A1* | 10/2015 | Akeley | G06T 5/00 |
| | | | 345/589 |
| 2015/0316833 A1 | 11/2015 | Watanabe et al. | |
| 2017/0094153 A1* | 3/2017 | Wang | H04N 25/704 |
| 2017/0223334 A1* | 8/2017 | Nobayashi | H04N 13/128 |
| 2019/0371051 A1* | 12/2019 | Dore | G06T 7/90 |
| 2024/0053594 A1* | 2/2024 | Steinert | G02B 21/367 |
| 2024/0069307 A1* | 2/2024 | Gregoire | G02B 7/38 |
| 2024/0280672 A1* | 8/2024 | Palmigiani | G01S 7/4914 |

FOREIGN PATENT DOCUMENTS

| | | | | |
|---|---|---|---|---|
| KR | 20150107571 A | * | 9/2015 | H04N 13/236 |
| KR | 10-2017-0098809 A | | 8/2017 | |
| KR | 10-2017-0120134 A | | 10/2017 | |
| KR | 10-2021-0095461 A | | 8/2021 | |
| WO | 2022/150903 A1 | | 7/2022 | |

* cited by examiner

IMAGING METHOD AND DEVICE FOR AUTOFOCUSING

CROSS-REFERENCE TO RELATED APPLICATION

This application claims priority from Korean Patent Application No. 10-2022-0125759, filed on Sep. 30, 2022, in the Korean Intellectual Property Office, the disclosure of which is incorporated herein by reference in its entirety.

BACKGROUND

1. Field

Methods and apparatuses consistent with embodiments relate to imaging technology for autofocusing.

2. Description of the Related Art

Due to the development of optical technology and image processing technology, image capturing devices are utilized in a wide variety of fields, such as fields related to multimedia content, security, and recognition. For example, an image capturing device may be mounted on a mobile device, a camera, a vehicle, or a computer to capture an image, recognize an object, or obtain data to control a device. The volume of the image capturing device may be determined based on, for example, the size of a lens, the focal length of the lens, and the size of a sensor. If the size of the lens with a constant photographing viewing angle decreases, the focal length of the lens may also decrease. Accordingly, multiple lenses including small lenses may be used to reduce the volume of the image capturing device.

SUMMARY

One or more embodiments may address at least the above problems and/or disadvantages and other disadvantages not described above. Also, the embodiments are not required to overcome the disadvantages described above, and an embodiment may not overcome any of the problems described above.

An imaging device may include an imaging lens array including a plurality of imaging lenses each with a same focal length, the plurality of imaging lenses being configured to capture a scene; a sensing array comprising a plurality of sensors configured to receive light passing through the plurality of imaging lenses; a processor configured to determine a scene depth plane corresponding to the scene based on a comparison, for each of a plurality of candidate depths, between reference pixel values that are based on first sensors of the plurality of sensors corresponding to a reference imaging lens of the plurality of imaging lenses and target pixel values that are based on second sensors of the plurality of sensors corresponding to a target imaging lens of the plurality of image lenses; and a lens driver configured to position the imaging lens array to be disposed at a point corresponding to the determined scene depth plane.

The processor being configured to determine the scene depth plane may include being configured to: project the reference pixel values and the target pixel values onto a plane with a same depth; and calculate an intensity difference between pixel values in pixel coordinates of the plane with the same depth.

The processor being configured to determine the scene depth plane may include being configured to: project pixel values corresponding to one of the reference imaging lens or the target imaging lens onto an image plane corresponding to another of the reference imaging lens or the target imaging lens; and calculate an intensity difference between pixel values for each pixel coordinate of the image plane.

The processor being configured to determine the scene depth plane may include being configured to: project first pixel values corresponding to one of the reference imaging lens or the target imaging lens onto a plane of each of the plurality of candidate depths; re-project the first pixel values, projected onto the plane of the corresponding candidate depth of the plurality of candidate depths, onto an image plane corresponding to another of the reference imaging lens or the target imaging lens; and calculate an intensity difference, in the image plane, between the re-projected first pixel values and second pixel values corresponding to the other of the reference imaging lens or the target imaging lens.

The processor being configured to determine the scene depth plane may include being configured to: calculate an intensity difference between the reference pixel values and the target pixel values for each of the plurality of candidate depths; and determine the scene depth plane based on the intensity difference calculated for each of the plurality of candidate depths.

The plurality of imaging lens may include one or more additional target imaging lenses. The processor being configured to determine the scene depth plane may include being configured to: determine a target depth plane corresponding to each of the target imaging lens and the one or more additional target imaging lenses, each of the target depth planes being based on a result obtained by (i) comparing the reference pixel values and the target pixel values, or (ii) comparing the reference pixel values and additional target pixel values that are based on the corresponding additional target imaging lens of the one or more additional target imaging lenses; and determine the scene depth plane based on the determined target depth planes.

The processor may be further configured to perform a comparison between the reference pixel values and target pixel values that are based on a target imaging lens spaced farthest along one axis from the reference imaging lens among a plurality of target imaging lenses.

The target imaging lens may be a first target imaging lens. The target pixel values may be first target pixel values. The processor may be further configured to perform a comparison between the first target pixel values and second target pixel values that are based on a second target imaging lens.

The processor being configured to determine the scene depth plane may include being configured to: project the first target pixel values and the second target pixel values onto an image plane corresponding to the reference imaging lens for a comparison with the reference pixel values; and calculate an intensity difference between the first target pixel values and the second target pixel values in the image plane.

The target imaging lens may be a first target imaging lens spaced farthest along a first axis from the reference imaging lens among a plurality of target imaging lenses. The target pixel values may be first target pixel values. The processor being configured to determine the scene depth plane may include being configured to: determine a target depth plane based on a comparison result between the reference pixel values and first target pixel values; and determine the scene depth plane by adjusting the target depth plane based on a comparison result between the reference pixel values and second target pixel values that are based on a second target imaging lens among the plurality of target imaging lenses spaced farthest along a second axis from the first target imaging lens.

The processor may be further configured to: perform a comparison between the second target pixel values and the reference pixel values for candidate depths of the plurality of candidate depths adjacent to the target depth plane based on the determined target depth plane; and update a plane corresponding to a candidate depth with a smallest intensity difference between the second target pixel values and the reference pixel values among the candidate depths adjacent to the target depth plane to the scene depth plane.

The plurality of candidate depths is set such that a depth of field based on an object distance corresponding to one of the plurality of candidate depths may at least partially overlap a depth of field corresponding to another candidate depth.

A near point distance determined based on a focal length of the imaging lens array and a permissible circle of confusion with respect to an object distance corresponding to at least one of the plurality of candidate depths may be within a range of the depth of field corresponding to the other candidate depth. A far point distance determined based on the object distance corresponding to the one candidate depth and the imaging lens array may be an infinite distance.

The processor may be further configured to: set a region of interest (ROI) in response to a user input; and determine the scene depth plane based on a result obtained by comparing pixel values corresponding to the set ROI among pixel values for each of the plurality of imaging lenses.

The processor may be further configured to: determine the reference pixel values by grouping values sensed by the sensors corresponding to the reference imaging lens in a first predesignated block unit; and determine the target pixel values by grouping values sensed by the sensors corresponding to the target imaging lens in a second predesignated block unit.

The processor may be further configured to determine an intensity value sensed by each sensing element as a pixel value of a corresponding sensing element regardless of a color channel.

The processor may be further configured to determine the point to which the imaging lens array is to be positioned, based on focus calibration information indicating a relationship between an object distance corresponding to the determined scene depth plane and a position of the imaging lens array in an optical system.

The processor may be further configured to project the reference pixel values or the target pixel values onto an image plane via a plane corresponding to a candidate depth, based on an intrinsic parameter and an extrinsic parameter obtained through a camera calibration for the plurality of imaging lenses.

A processor-implemented method may include: receiving a sensor signal corresponding to light passing through a plurality of imaging lenses each with a same focal length to capture a scene from a plurality of sensors; determining a scene depth plane corresponding to the scene based on a comparison, for each of a plurality of candidate depths, between reference pixel values that are based on first sensors of the plurality of sensors corresponding to a reference imaging lens of the plurality of imaging lenses and target pixel values that are based on second sensors of the plurality of sensors corresponding to a target imaging lens of the plurality of image lenses; and transmitting a driver signal to a lens driver, the driving signal directing the lens driver to position the imaging lens array to be disposed at a point corresponding to the determined scene depth plane.

A non-transitory computer-readable storage medium storing instructions that, when executed by a processor, may cause the processor to perform the method including: receiving a sensor signal corresponding to light passing through a plurality of imaging lenses each with a same focal length to capture a scene from a plurality of sensors; determining a scene depth plane corresponding to the scene based on a comparison, for each of a plurality of candidate depths, between reference pixel values that are based on first sensors of the plurality of sensors corresponding to a reference imaging lens of the plurality of imaging lenses and target pixel values that are based on second sensors of the plurality of sensors corresponding to a target imaging lens of the plurality of image lenses; and transmitting a driver signal to a lens driver, the driving signal directing the lens driver to position the imaging lens array to be disposed at a point corresponding to the determined scene depth plane.

Additional aspects of embodiments will be set forth in part in the description which follows and, in part, will be apparent from the description, or may be learned by practice of the disclosure.

BRIEF DESCRIPTION OF THE DRAWINGS

The above and/or other aspects will be more apparent by describing certain embodiments with reference to the accompanying drawings, in which.

DETAILED DESCRIPTION

Figure 1:
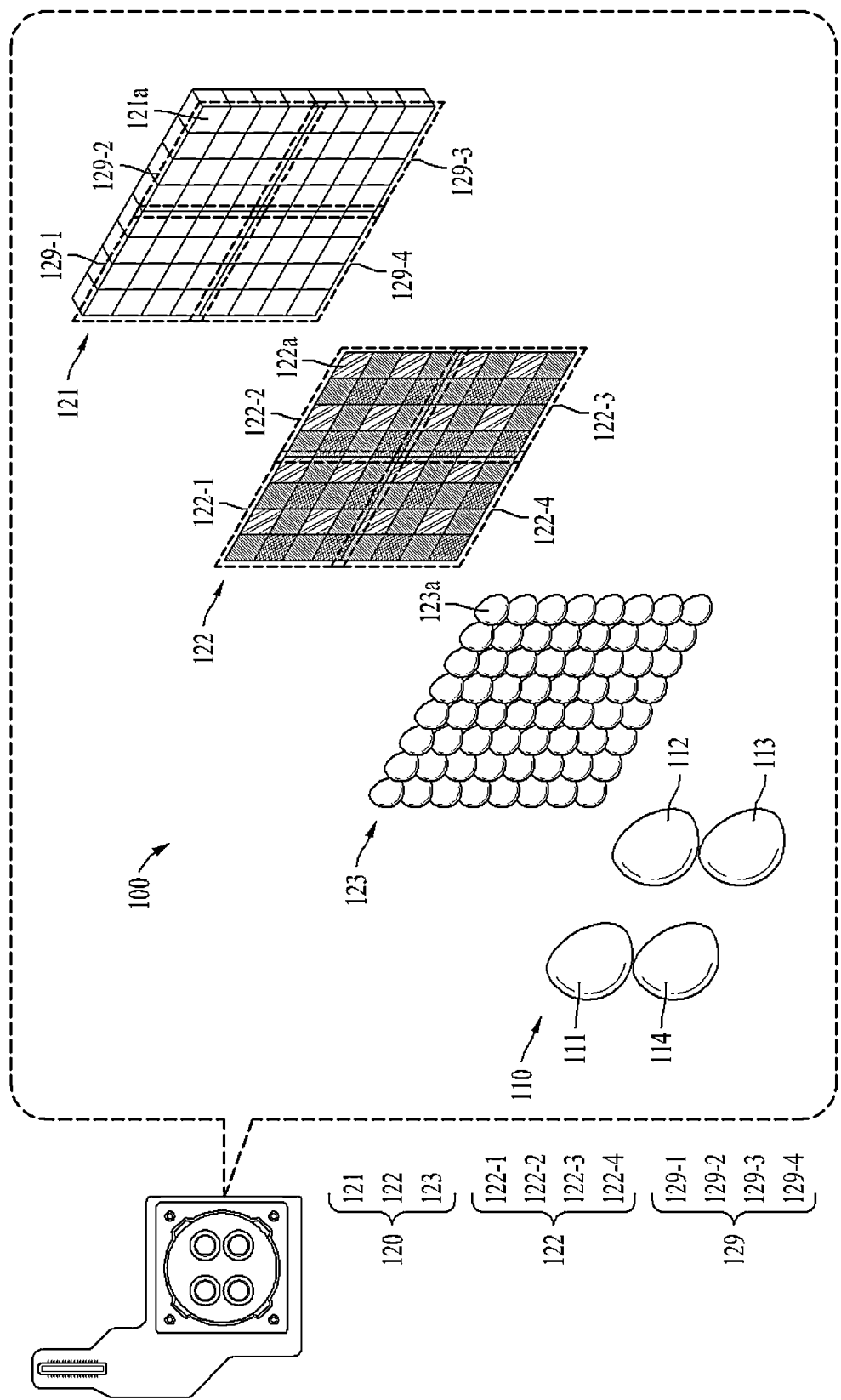
FIGS. 1 and 2 illustrate examples of a structure of an imaging device according to an embodiment.

The following detailed structural or functional description is provided as an example only and various alterations and modifications may be made to embodiments. Accordingly, the embodiments are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the embodiments will be described in detail with reference to the accompanying drawings. When describing the embodiments with reference to the accompanying drawings, like reference numerals refer to like elements and a repeated description related thereto will be omitted.

Figure 2:
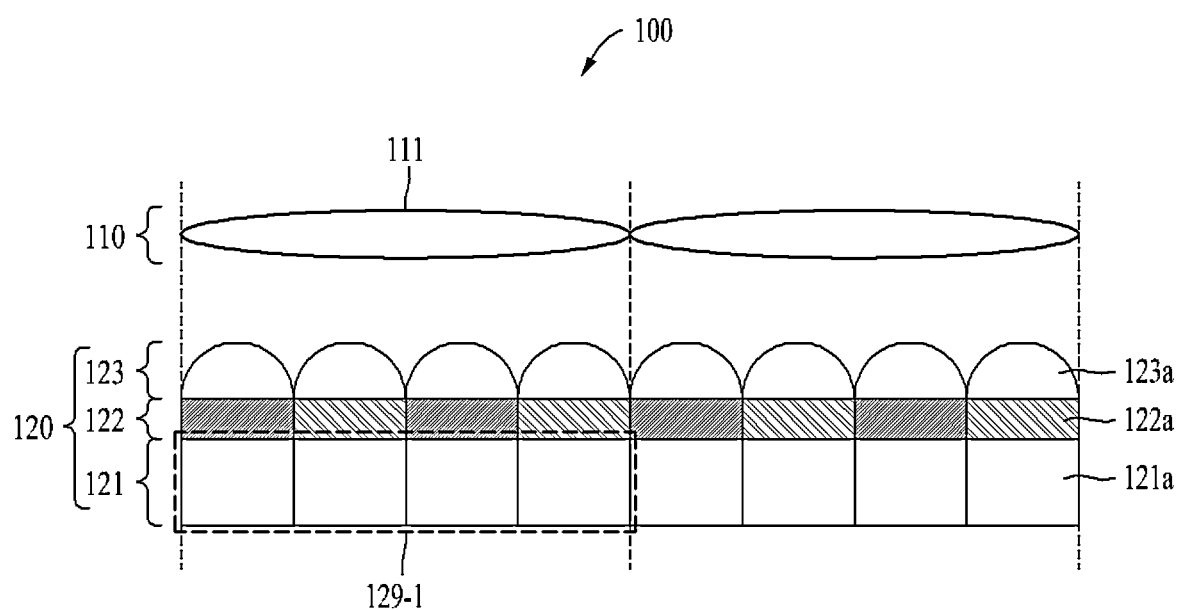

FIGS. 1 and 2 illustrate examples of a structure of an imaging device according to an embodiment. FIG. 1 is a perspective view of an imaging device, and FIG. 2 is a cross-sectional view of the imaging device.

An imaging device 100 may include a lens array 110 and an image sensor 120. The lens array 110 may include lens elements (e.g., lenses), and the image sensor 120 may include optical sensing elements (e.g., optical sensors). The lens elements may be disposed along a plane of the lens array 110, and the optical sensing elements may be disposed along a plane of a sensing array 121 in the image sensor 120. The plane of the lens array 110 may be parallel with a plane of the sensing array 121. The lens array 110 may be a multi-lens array (MLA) for imaging, and may also be referred to as an "imaging lens array". A camera device including an imaging lens array may also be referred to as an "array lens camera."

An optical sensing element (hereinafter, also referred to as a "sensing element") may be an element that senses optical information based on light incident onto the corresponding element, and may output a value indicating an intensity of the incident light. The optical sensing element may include, for example, a complementary metal-oxide-semiconductor (CMOS), a charge-coupled device (CCD), and a photodiode.

A picture element (hereinafter, also referred to as a "pixel") may be basic unit information constituting an image, and may indicate optical information obtained by a sensing element sensing light reflected from a physical position on a subject corresponding to a pixel position. The pixel position may a position of a pixel in an image and may be based on a pixel coordinate system. The physical position may be based on a world coordinate system. The world coordinate system may be a three-dimensional (3D) coordinate system using a point in a physical space as the origin. The pixel coordinate system may also be referred to as an image coordinate system, and may be a two-dimensional (2D) coordinate system using a point on an image plane (e.g., a point corresponding to an edge of an image) as the origin, having one axis (e.g., a horizontal axis) of an image as an x-axis, and having the other axis (e.g., a vertical axis) as a y-axis. The camera coordinate system may be a 3D coordinate system using a focus of a camera or a center of a lens as the origin and having an optical axis of the camera as a z-axis.

For reference, a pixel constituting a color image may have a pixel value for a single pixel position. A pixel value may have a plurality of color values (e.g., a red value, a green value, and a blue value in an RGB color system). In a field of a display, a unit pixel constituting a display may include sub-pixels (for example, a red sub-pixel, a green sub-pixel, and a blue sub-pixel in an RGB color system) for a plurality of colors to express color values of one pixel position In a field of an image sensor, a pixel is not divided into sub-pixels for each color and generally refers to a sensing element (e.g., a photodiode with a color filter disposed at the front) that senses one color value. In addition, in the field of the image sensor, a pixel may refer to a sensing element and a value sensed by the sensing element, interchangeably. However, as used in this description, a pixel is basic unit information constituting an image, and a sensing element is a hardware element that outputs a pixel value of a corresponding pixel in response to light being received from a subject.

For example, a pixel value of each pixel may be determined based on a sensing of a single sensing element, or a sensing of a plurality of sensing elements that is grouped. Although an amount of light that may be sensed by a single sensing element is limited, sensitivity may be enhanced by expressing one pixel using values sensed by a plurality of sensing elements. A pixel value of one pixel may be determined based on a value obtained by summing intensity values sensed by the sensing elements grouped in units of blocks. For example, by digital binning that will be described below with reference to FIG. 13, photosensitivity of the imaging device 100 and/or the image sensor 120 may be enhanced, and an image quality may be enhanced even in a low illuminance.

The image sensor 120 may include the sensing array 121, an optical filter 122 (e.g., a color filter array), and a condensing lens array 123. However, the embodiments are not limited thereto, and the optical filter 122 may also be implemented integrally with the condensing lens array 123 including an individual condensing microlens 123a that has an optical characteristic of passing a predetermined wavelength band and blocking the remaining wavelength bands.

The condensing lens array 123 may include a plurality of condensing microlenses to concentrate light passing through the lens array 110 to the sensing array 121. For example, a number of condensing microlenses included in the condensing lens array 123 may be equal to a number of sensing elements included in the sensing array 121. The plurality of condensing microlenses 123*a* may be disposed between imaging optical lenses 110 and the sensing array 121 and may transmit light passing through the imaging optical lenses to sensing elements 121*a* corresponding to respective condensing microlenses 123*a* by concentrating the light in the sensing elements 121*a*. For example, as illustrated in FIG. 2, a condensing microlens 123*a* may be disposed on each sensing element 121*a* of the sensing array 121 to concentrate light in the sensing element 121*a* disposed thereunder. Further, as illustrated in FIG. 2, a color pass filtering element 122*a* may be disposed between each condensing microlens 123*a* and each sensing element 121*a*.

The optical filter 122 may be a filter that has an optical characteristic of passing a predetermined wavelength band and blocking the remaining wavelength bands. The optical filter 122 may include one or more color filters. For example, the optical filter 122 may be implemented as a color filter array (CFA) including a plurality of color filters 122-1, 122-2, 122-3, and 122-4 disposed along a filter plane. Each color filter may include a plurality of color pass filtering elements 122*a*. In FIG. 1, the color filters 122-1, 122-2, 122-3, and 122-4 are separately illustrated for each of regions corresponding to the plurality of imaging lenses 111, 112, 113, and 114, however, the embodiments are not limited thereto. For example, the color filters 122-1, 122-2, 122-3, and 122-4 may also be implemented as optical filters, each including a plurality of color pass filtering elements 122*a*.

Each color pass filtering element 122*a* may be a filter that passes light of a wavelength band corresponding to a predetermined color, and blocks light of the remaining bands. Each color pass filtering element 122*a* may receive light passing through a corresponding imaging lens and transmit light corresponding to a wavelength of a single color (e.g., one of red, blue and green) among the received light. Each color pass filtering element 122*a* may include, for example, a red pass filtering element, a green pass filtering element, and a blue pass filtering element. The red pass filtering element may pass light of a wavelength band corresponding to red and block light of the remaining bands. The green pass filtering element may pass light of a wavelength band corresponding to green and block light of the remaining bands. The blue pass filtering element may pass light of a wavelength band corresponding to blue and block light of the remaining bands. An example in which color pass filtering elements of an optical filter are arranged in a Bayer pattern will be mainly described, however, embodiments are not limited thereto. The Bayer pattern may be, for example, a pattern in which color pass filtering elements are alternately arranged in an optical filter such that a green pass filtering element may be 50% and that each of a red pass filtering element and a blue pass filtering element may be 25%, and a unit block of the Bayer pattern may be a GB/RG block.

A quality of an image captured and restored by the image sensor 120 may be determined based on the number of sensing elements included in the sensing array 121 and an amount of light incident on the sensing elements 121*a*. For example, a resolution of an image may be determined based on the number of sensing elements included in the sensing array 121, and a sensitivity of the image may be determined based on an amount of light incident on the sensing elements 121*a*. The amount of incident light may be determined based on a size of the sensing elements 121*a* or a size of a block for grouping (e.g., a binning size). As the size of the sensing elements 121*a* or the size of the block increases, the amount of incident light may increase, and a dynamic range of the sensing array 121 may increase. Thus, as the number of sensing elements included in the sensing array 121 increases, a resolution of an image captured by the image sensor 120 may increase. In response to an increase in the size of the sensing elements 121*a* and/or the size of the blocks, the image sensor 120 may advantageously operate to capture an image having a high sensitivity in a low illuminance.

The lens array 110 may include one or more imaging lenses. For example, a first imaging lens 111, a second imaging lens 112, a third imaging lens 113, and a fourth imaging lens 114 are illustrated in FIG. 1. Each of the first imaging lens 111 through the fourth imaging lens 114 of the lens array 110 may cover sensing regions 129 of the sensing array 121 corresponding to a lens size thereof. The sensing regions 129 of the sensing array 121 covered by each of the first imaging lens 111 through the fourth imaging lens 114 may be determined based on lens specifications (e.g., a size, a curvature, or a thickness) of a corresponding imaging lens. For example, the first imaging lens 111 through the fourth imaging lens 114 may have the same focal length. The sensing regions 129 may be regions on the sensing array 121 where rays of a predetermined field of view (FOV) range reach after passing through a corresponding imaging lens. A size of each of the sensing regions 129 may be expressed as a distance or a diagonal length from a center of a corresponding sensing region to an outermost point of the sensing region. In other words, light passing through a corresponding imaging lens may be incident on sensing elements included in each of the sensing regions 129. For example, the sensing regions 129 may include a first sensing region 129-1, a second sensing region 129-2, a third sensing region 129-3, and a fourth sensing region 129-4. Information sensed in each of the sensing regions 129 will be described below.

Each of the sensing elements in the sensing array 121 may generate sensing information based on rays passing through the first imaging lens 111 through the fourth imaging lens 114 of the lens array 110. For example, the sensing element 121*a* may sense an intensity value of light received through an imaging lens as the sensing information. The imaging device 100 and/or the image sensor 120 may determine intensity information corresponding to an original signal related to points included in the FOV of the imaging device 100 based on the sensing information output from the sensing array 121. The imaging device 100 and/or the image sensor 120 may restore a captured image based on the determined intensity information. The sensing element 121*a* may generate a color intensity value corresponding to a desired color as the sensing information by sensing light passing through the color pass filtering element 122*a*. Each of the plurality of sensing elements in the sensing array 121 may be disposed to sense light of a color wavelength designated for each of the sensing regions 129. The sensing array 121 may sense an intensity of light passing through a corresponding imaging lens and a corresponding color filter, using sensing elements arranged in each sensing region. The imaging device 100 and/or the image sensor 120 may generate a color channel image by rearranging and/or shuffling pixel values for each color channel in each sensing region, and may restore the captured image based on the generated color channel image. The imaging device 100 and/or the image sensor 120 may determine an intensity value sensed by each sensing element as a pixel value of a corresponding sensing element regardless of a color channel. The imaging device 100 and/or the image sensor 120 may perform autofocusing using a pixel value of each pixel position (e.g., a sensing value of a corresponding sensing element, or a value obtained by grouping a plurality of sensing values), regardless of color. Autofocusing will be described with reference to FIG. 3 below.

The image sensor 120 may obtain a partial image from sensing information of sensing elements that sense light passing through each of the plurality of imaging lenses 111, 112, 113, and 114. The partial image may be an image representing a scene corresponding to a FOV range of a corresponding imaging lens. The scene corresponding to the FOV range may also be referred to as a "view." The partial image may be an image in which pixel values of various colors are mixed. The image sensor 120 may obtain a partial image of a view corresponding to each imaging lens. In other words, the image sensor 120 may obtain the same number of partial images as a number of imaging lenses, e.g., the imaging lenses 111, 112, 113, and 114. A set of partial images may also be referred to as a "compound eye vision (CEV) image."

For example, the lens array 110 may include the first imaging lens 111, the second imaging lens 112, the third imaging lens 113, and the fourth imaging lens 114. The color filter array 122 may include a first color filter 122-1, a second color filter 122-2, a third color filter 122-3, and a fourth color filter 122-4. The sensing elements included in the sensing array 121 may be classified by the first color sensing region 129-1, the second color sensing region 129-2, the third color sensing region 129-3, and the fourth sensing region 129-4.

A 3D color system (e.g., an RGB color space) is mainly described herein. However, the embodiments are not limited thereto and may also be applicable to an n-dimensional color system. Here, "n" may be an integer greater than or equal to "4." The example in which color pass filtering elements are arranged in the Bayer pattern has been mainly described, however, the embodiments are not limited thereto. In another example, color pass filtering elements may be arranged in other color patterns. The imaging device 100 may also be referred to as a "camera device."

The imaging device 100 may automatically set a focus corresponding to a full scene and/or a subject based on a comparison between pixels of views corresponding to the plurality of imaging lenses 111, 112, 113, and 114. Hereinafter, autofocusing by the imaging device 100 will be described.

Figure 3:
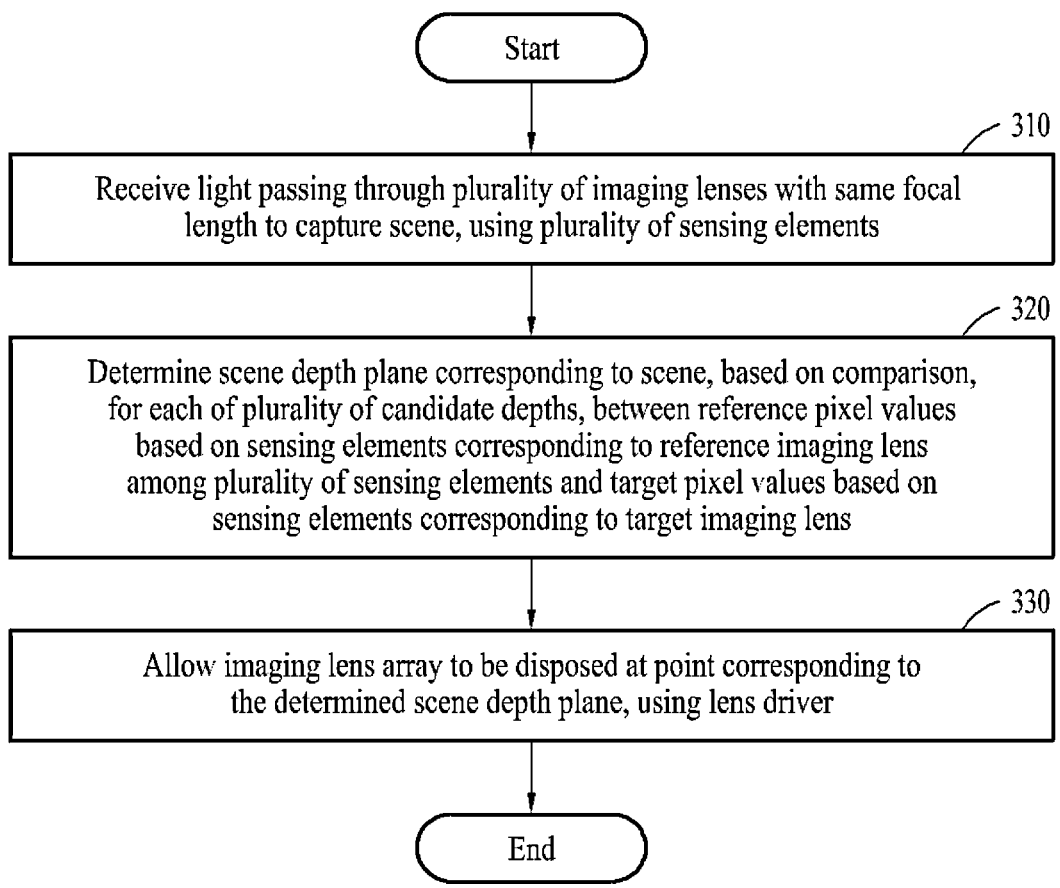
FIGS. 3 and 4 are flowcharts illustrating examples of a method of operating an imaging device according to an embodiment.
Figure 4:
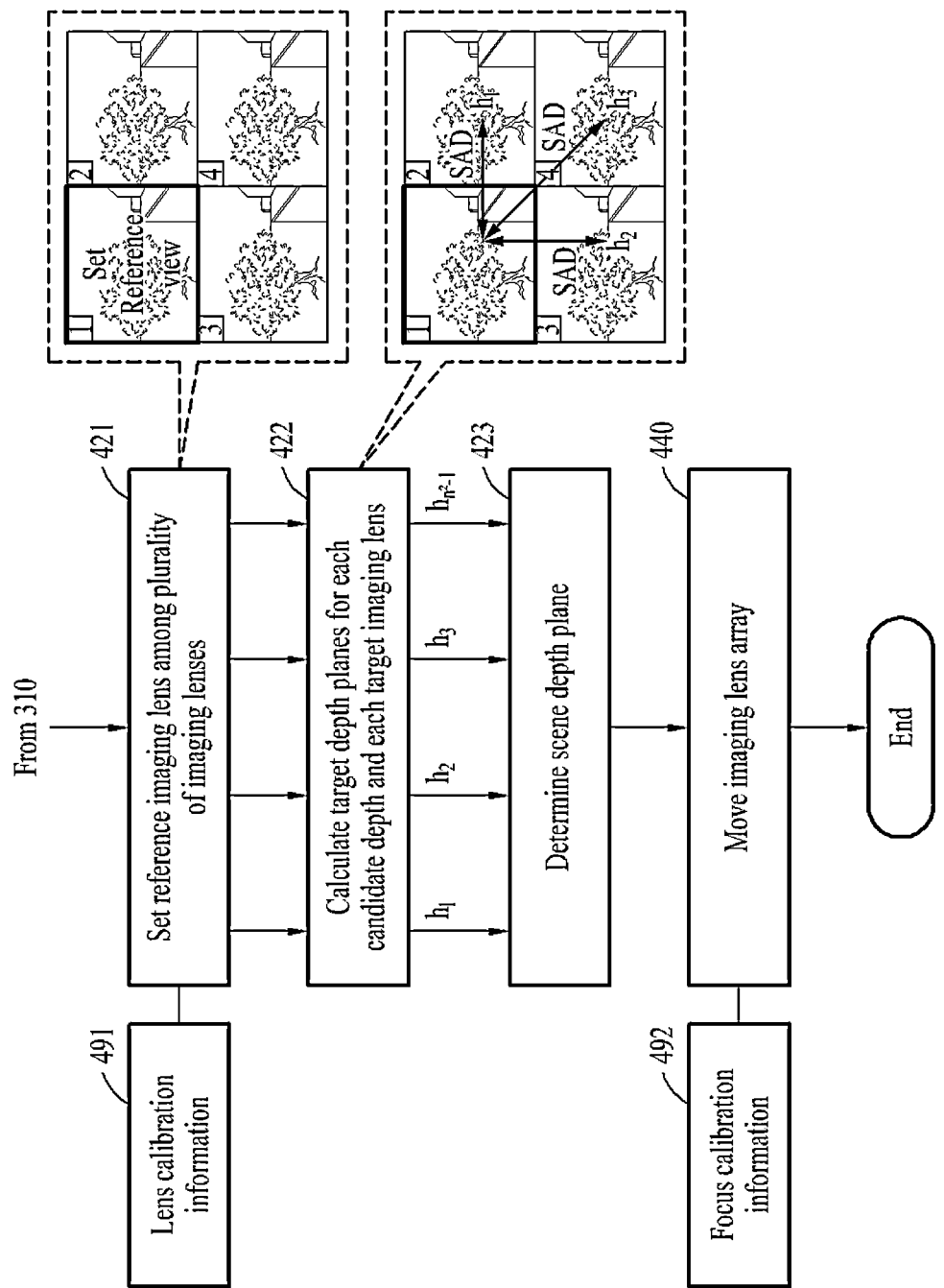

FIGS. 3 and 4 are flowcharts illustrating examples of a method of operating an imaging device according to an embodiment.

FIG. 3 illustrates a method of adjusting a focus of an imaging device according to an embodiment.

In operation 310, the imaging device may receive light passing through a plurality of imaging lenses with the same focal length to capture a scene, using a plurality of sensing elements. The imaging device may detect intensity information (e.g., a sensing value) indicating a partial scene (e.g., a view) corresponding to each imaging lens from sensing elements of a sensing region corresponding to each imaging lens.

In operation 320, the imaging device may determine a scene depth plane corresponding to the scene, based on a comparison, for each of a plurality of candidate depths, between reference pixel values that are based on sensing elements corresponding to a reference imaging lens among the plurality of sensing elements and target pixel values that are based on sensing elements corresponding to a target imaging lens. The imaging device may select a reference view from among a plurality of views. An imaging lens that passes a ray corresponding to the reference view may be referred to as a reference imaging lens. A reference pixel value may be a pixel value that is based on a sensed intensity value of a ray corresponding to the reference view. The imaging device may select a target view different from the reference view. The imaging device may select one or more target views and compare each of the target views to the reference view. An imaging lens that passes a ray corresponding to a target view may be referred to as a target imaging lens. A target pixel value may be a pixel value that is based on a sensed intensity value of a ray corresponding to a target view. For example, the imaging device may calculate an intensity difference of pixels between a target view and a reference view.

A candidate depth may be a depth at which a point corresponding to a subject or a background appearing in a view (e.g., a reference view or a target view) may be potentially disposed. The imaging device may project reference pixel values of the reference view or target pixel values of the target view onto the same plane with respect to the plurality of candidate depths, and may determine the scene depth plane based on a projection result. The scene depth plane may be a plane of a depth corresponding to a subject included in a corresponding scene or the entire scene. The scene depth plane may be selected as a plane corresponding to one of the above-described candidate depths, but is not limited thereto, and may also be calculated based on the candidate depths. For example, the scene depth plane may be a plane corresponding to a depth calculated based on a statistical value (e.g., a mean value, a median value, or a minimum value) of candidate depths determined based on a comparison of pixel values between a reference view and a target view. A projection through a candidate depth will be described with reference to FIG. 5 below.

Subsequently, in operation 330, the imaging device may allow an imaging lens array to be disposed at a point corresponding to the determined scene depth plane, using a lens driver. The lens driver may include a motor. The imaging device may physically move (e.g., move forward or backward) the imaging lens array along an optical axis by driving the motor. An individual depth plane and a point corresponding to the individual depth plane may be mapped in advance by a focus calibration that will be described below with reference to FIG. 11, which will be described below. The point corresponding to the individual depth plane may be a point on an optical axis that allows each imaging lens of the imaging lens array to form a focus within a depth of focus corresponding to a depth of field including a corresponding depth plane. The depth of field may indicate a subject-side range of a subject focused by an imaging lens, and the depth of focus may indicate an imaging sensor-side range of an image sensor focused by the imaging lens.

Since an imaging device in some embodiments includes a multi-aperture lens, the imaging device may be implemented with a short focal length and a small thickness in comparison to a single-aperture lens. A relatively large sensor may be required to capture an image with a high sensitivity and/or high resolution. Although a size of a sensor further increases due to the multi-lens structure, an increase in a physical focal length of an imaging lens may be suppressed. The imaging device may capture an image with a high resolution and/or high sensitivity despite the small thickness based on the above-described multi-lens structure. The imaging device may be applied to an image capturing camera and/or a vision camera. The imaging device may be mounted on, for example, a smartphone, a tablet personal computer (PC), a notebook PC, an autonomous vehicle, a robot, a drone, and an augmented reality (AR) glasses device.

FIG. 4 illustrates calibrations and an operation of calculating target depth planes for each target imaging lens according to an embodiment.

For example, an imaging lens array may include imaging lenses arranged in a 2×2 array. Due to a parallax (e.g., a vertical parallax, a horizontal parallax, and a diagonal parallax) between the imaging lenses of the above-described imaging lens array, an imaging device may capture partial images with a disparity according to a depth of a subject. An imaging device in some embodiments may determine a depth plane on which a subject needing to be focused is positioned using image information captured through the imaging lens array, and may adjust a focus of the imaging lens array to focus on the subject. For example, the imaging device may perform autofocusing using pixel values of the partial images with the disparity, without a separate phase difference (PD) pixel. The imaging device may determine a depth plane to be focused, using information (e.g., an intensity difference between pixels of different views projected onto the same plane) derived from the above-described disparity.

First, lens calibration information 491 may be prepared. The above-described individual imaging lens and a sensing region corresponding to the corresponding imaging lens may be interpreted as a type of unit camera. The lens calibration information 491 may include a camera parameter of an individual imaging lens. For example, the lens calibration information 491 may include an intrinsic parameter and an extrinsic parameter of an imaging lens. The intrinsic parameter may include a focal length, a principal point, and a skew coefficient. The extrinsic parameter may be a parameter that describes a conversion relationship between a camera coordinate system and a world coordinate system corresponding to a corresponding imaging lens, and may include parameters of rotation, scale, and translation between the two coordinate systems. In addition, the extrinsic parameter may include a parameter that describes a conversion relationship between two camera coordinate systems corresponding to two imaging lenses. For example, the conversion relationship between the two camera coordinate systems (e.g., a first camera coordinate system and a second camera coordinate system) may be obtained based on a relationship of a conversion from the first camera coordinate system to the world coordinate system and a relationship of a conversion from the world coordinate system to the second camera coordinate system. The lens calibration information 491 may be obtained through a lens calibration before a release and/or manufacturing of a product. An example of a lens calibration operation will be described with reference to FIG. 5 below.

In operation 421, the imaging device may set a reference imaging lens among a plurality of imaging lenses. In other words, the imaging device may set a partial image corresponding to a reference view among a plurality of partial images. For example, when the imaging device includes "N×N" imaging lenses, the imaging device may obtain partial images corresponding to the "N×N" views. The imaging device may set one of the "N×N" views as a reference view. In this example, "N" may be an integer greater than or equal to "2." For convenience of description, "N×N" imaging lenses are described, however, the embodiments are not limited thereto. For example, "N×M" imaging lenses may be provided. In this example, "M" may be an integer greater than or equal to "1."

In operation 422, the imaging device may calculate target depth planes for each candidate depth and each target imaging lens. The imaging device may compare pixels of each target view and pixels of the reference view, for a plurality of candidate depths. For example, the imaging device may project reference pixels based on a camera coordinate system of a reference view onto a plane corresponding to a candidate depth based on the world coordinate system, based on the above-described lens calibration information 491 (e.g., extrinsic parameters). The imaging device may re-project the projected reference pixels onto a plane corresponding to a target view (e.g., a camera coordinate system of a target imaging lens). The camera coordinate system may represent coordinates on an image plane of a corresponding camera.

The imaging device may compare corresponding points between the re-projected reference pixel values and target pixel values. For example, the imaging device may calculate an intensity difference between values of pixel coordinates corresponding to each other in reference pixel values and target pixel values. The imaging device may calculate an intensity difference between a reference pixel value of one pixel at coordinates in the camera coordinate system of the target view among the re-projected reference pixels and a target pixel value of a pixel at the same coordinates. For reference, although an example of projecting pixels from the reference view to the target view has been described above, the embodiments are not limited thereto. In another example, pixels may be projected from the target view to the reference view. The imaging device may calculate a sum (e.g., a sum of absolute difference (SAD) values) of intensity differences between the above-described corresponding pixels.

The imaging device may calculate an intensity difference between reference pixel values and target pixel values for each of a plurality of candidate depths. For example, the imaging device may calculate SAD values for the plurality of candidate depths while changing a candidate depth. The imaging device may determine a target depth plane, based on a result obtained by comparing reference pixel values to target pixel values that are based on a corresponding target imaging lens for each of a plurality of target imaging lenses. The imaging device may determine the target depth plane based on a sum (e.g., a SAD value) of the calculated intensity differences. The target depth plane may be a plane of a depth at which a scene or subject is potentially positioned for a reference view and a target view. The imaging device may determine a candidate depth having a smallest SAD value among the SAD values calculated for the plurality of candidate depths as a target depth plane. For example, the imaging device may calculate target depth planes for the remaining views (e.g., "$N^2-1$" target views) based on the reference view.

For reference, an example in which the imaging device performs a pixel comparison between all target imaging lenses and the reference imaging lens has been described above with reference to FIG. 4, however, the embodiments are not limited thereto. The imaging device may perform a pixel comparison between at least one target imaging lens and the reference imaging lens. Examples of a pixel comparison between views corresponding to imaging lenses will be described with reference to FIGS. 8 through 10 below.

In operation 423, the imaging device may determine a scene depth plane. The imaging device may determine the scene depth plane based on the target depth planes calculated for the plurality of target imaging lenses. For example, the imaging device may determine the scene depth plane based on an intensity difference calculated for each of the plurality of candidate depths. The imaging device may calculate the target depth planes based on SAD values as intensity differences in operation 422, as described above, and may determine the scene depth plane based on the target depth planes. In an example, the imaging device may determine a depth corresponding to a statistical value (e.g., a mean value, and a median value) of a plurality of target depth planes (e.g., "$N^2-1$" target depth planes) calculated in operation 422, as the scene depth plane. In another example, the imaging device may also determine a most frequent depth among the plurality of target depth planes as the scene depth plane. In another example, the imaging device may also determine a depth, at which entire SAD values are minimized, as the scene depth plane.

In operation 440, the imaging device may move the imaging lens array. For example, the imaging device may move the imaging lens array to a point corresponding to the scene depth plane. The imaging device may move the imaging lens array such that each imaging lens of the imaging lens array may focus on a depth of focus corresponding to a depth of field including the scene depth plane. The imaging device may move the imaging lens array, using focus calibration information 492. The focus calibration information 492 may include a mapping relationship between an object distance and a point on an optical axis of an imaging lens. The imaging device may search for and/or determine an object distance corresponding to the scene depth plane and may move an imaging lens to a point mapped to the object distance. The imaging device may move the imaging lens along the optical axis by driving a motor of a lens driver. An example of a focus calibration operation will be described with reference to FIG. 11 below.

The imaging device in some embodiments may perform autofocusing through the above-described operations. In other words, the imaging device may focus on a scene and/or a subject.

Figure 5:
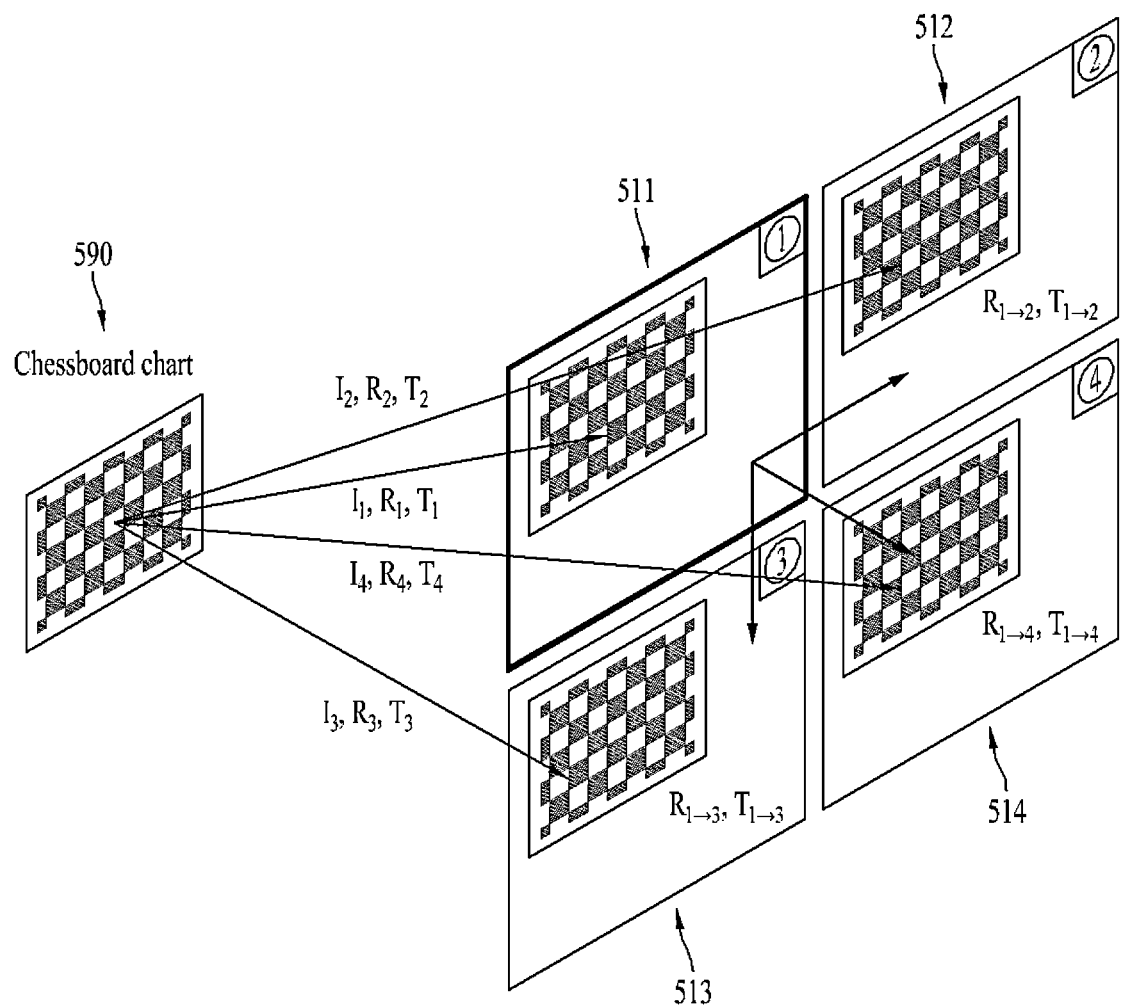
FIG. 5 illustrates an example of a camera calibration according to an embodiment.

FIG. 5 illustrates an example of a camera calibration according to an embodiment.

The lens calibration information 491 described above with reference to FIG. 4 may be obtained before a product is released. A camera calibration may be performed on a product in which an imaging lens array and an image sensor are combined. The camera calibration may be an operation of searching for an intrinsic parameter I and an extrinsic parameter (e.g., a rotation parameter R, and a translation parameter T) to convert 3D coordinates of a subject in the world coordinate system to the camera coordinate system. As described above, each imaging lens of the imaging lens array may be regarded as an independent unit camera, and a camera calibration for an individual imaging lens may also be referred to as a "lens calibration." For example, an imaging lens array with a 2×2 array structure may include four imaging lenses, and extrinsic parameters and intrinsic parameters of each imaging lens may be searched for.

$$\begin{bmatrix} x \\ y \\ 1 \end{bmatrix} = \begin{bmatrix} f_x & \gamma & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{[Equation 1]}$$

In Equation 1, X, Y, and Z each denote coordinates in the world coordinate system, and x, and y denote coordinates of the camera coordinate system. In addition, $r_{11}$, $r_{12}$, $r_{13}$, $r_{21}$, $r_{22}$, $r_{23}$, $r_{31}$, $r_{32}$, and $r_{33}$ denote rotation parameters among extrinsic parameters, $t_1$, $t_2$, and $t_3$ denote translation parameters among extrinsic parameters. $f_x$, and $f_y$ denote focal lengths among intrinsic parameters, $c_x$ and $c_y$ denote principal points among intrinsic parameters, and $\gamma$ denotes a skew coefficient among intrinsic parameters.

To estimate an extrinsic parameter and an intrinsic parameter of a unit camera corresponding to each imaging lens, unit cameras may obtain a plurality of images by capturing a predetermined pattern 590 (e.g., a chessboard chart), as illustrated in FIG. 5. Partial images 511, 512, 513, and 514 corresponding to imaging lenses may be obtained. Intrinsic parameters and extrinsic parameters for each unit camera may be estimated. For example, for a first imaging lens of the 2×2 imaging lens array, a first intrinsic parameter $I_1$, a first rotation parameter $R_1$, and a first translation parameter $T_1$ may be estimated in advance. For a second imaging lens, a second intrinsic parameter $I_2$, a second rotation parameter $R_2$, and a second translation parameter $T_2$ may be estimated in advance. For a third imaging lens, a third intrinsic parameter $I_3$, a third rotation parameter $R_3$, and a third translation parameter $T_3$ may be estimated in advance. For a fourth imaging lens, a fourth intrinsic parameter $I_4$, a fourth rotation parameter $R_4$, and a fourth translation parameter $T_4$ may be estimated in advance.

In addition, a parameter for a conversion relationship between camera coordinate systems of the imaging lenses may also be calculated. For example, Equation 1 described above may include a coordinate conversion matrix that converts the world coordinate system to the camera coordinate system, and the coordinate conversion matrix may include an extrinsic parameter and an intrinsic parameter. A first coordinate conversion matrix may be a matrix that converts position coordinates on the world coordinate system to a first camera coordinate system of a view (e.g., a reference view) corresponding to the first imaging lens. In contrast, an inverse matrix of the first coordinate conversion matrix may be a matrix representing a conversion from the first camera coordinate system to the world coordinate system. Therefore, when a second coordinate conversion matrix is a matrix that converts the position coordinates on the world coordinate system to a second camera coordinate system of the second imaging lens, a matrix product result of the inverse matrix of the first coordinate conversion matrix and the second coordinate conversion matrix may include a rotation parameter $R_{1 \to 2}$ and a translation parameter $T_{1 \to 2}$ that indicate a conversion from the camera coordinate system to the second camera coordinate system. Similarly, parameters $R_{1 \to 3}$ and $T_{1 \to 3}$ indicating a conversion from the first camera coordinate system to a third camera coordinate system, and parameters $R_{1 \to 4}$ and $T_{1 \to 4}$ indicating a conversion from the first camera coordinate system to a fourth camera coordinate system may be calculated.

Figure 6:
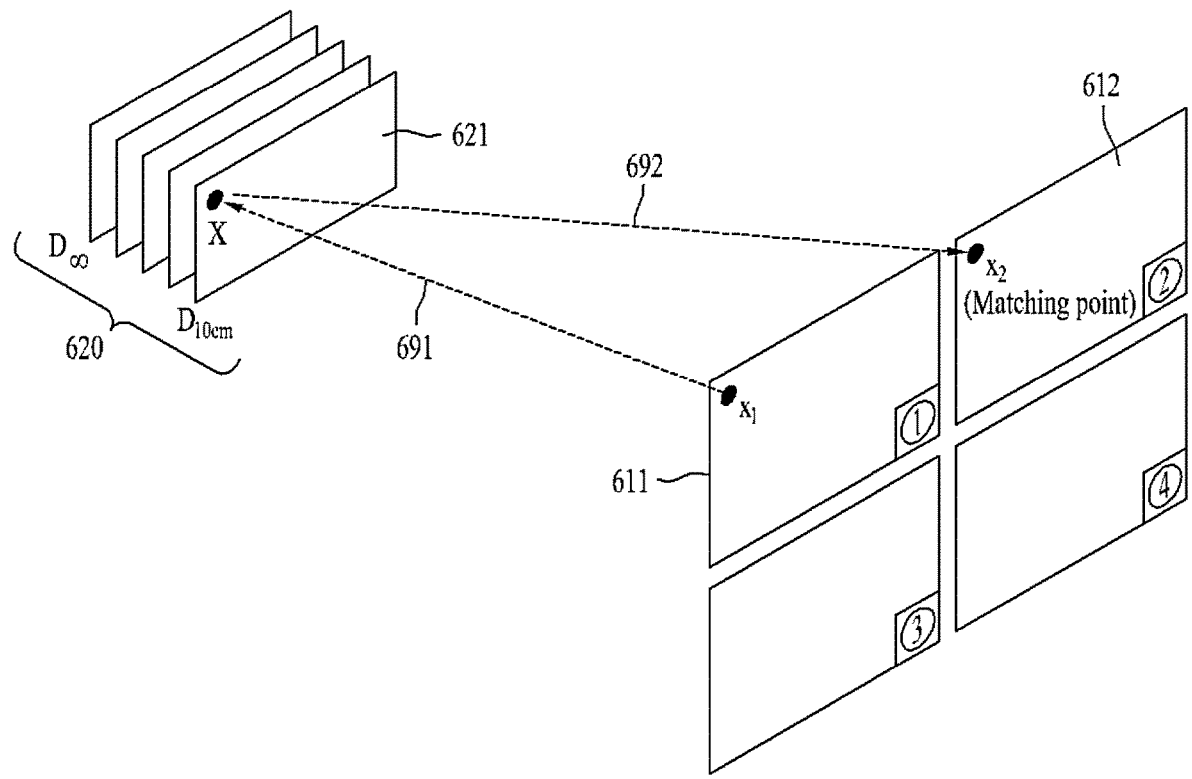
FIG. 6 illustrates a projection of pixel values according to an embodiment.

FIG. 6 illustrates a projection of pixel values according to an embodiment.

An imaging device in some embodiments may calculate an intensity difference between pixels based on a result obtained by converting pixels of a reference view 611 and a target view 612 to coordinates (e.g., coordinates on the same image plane) of the same coordinate system.

The imaging device may project reference pixel values and the target pixel values onto the same plane. For example, the imaging device may convert coordinates of a reference pixel and coordinates of a target pixel to the same coordinate system (e.g., the same camera coordinate system). For example, the imaging device may project pixel values corresponding to one of a reference imaging lens and a target imaging lens onto an image plane corresponding to the other imaging lens. The image plane may be, for example, an x-y plane of a camera coordinate system. For reference, an example of projecting pixels from the reference view 611 to the target view 612 is described with reference to FIG. 6, however, the embodiments are not limited thereto. In another example, pixels may be projected from the target view 612 to the reference view 611.

In operations 691 and 692, the imaging device may project reference pixel values or target pixel values onto an image plane via a plane 621 corresponding to a candidate depth, based on intrinsic parameters and extrinsic parameters obtained through a camera calibration for a plurality of imaging lenses. In operation 691, the imaging device may project first pixel values corresponding to one of the reference imaging lens and the target imaging lens onto a plane of each of a plurality of candidate depths 620.

For example, view ① shown in FIG. 6 may be set as the reference view 611. The imaging device may select a candidate depth. The candidate depth may be one of depths between a minimum distance and a maximum distance (e.g., an infinite distance ∞ or a hyperfocal distance) that may be focused by an imaging lens. In operation 691, the imaging device may project pixel coordinates of pixel values of the view ① (e.g., coordinates based on a camera coordinate system of lens ①) to world coordinates on a plane 621 corresponding to the selected candidate depth based on the world coordinate system, using the obtained lens calibration information of FIG. 5.

In operation 692, the imaging device may re-project first pixel values, projected onto a plane of a corresponding candidate depth, onto an image plane corresponding to the other imaging lens. For example, in the example shown in FIG. 6, the imaging device may project the pixel values of the view ①, which have been projected for the candidate depth, to a camera coordinate system of view ②. In other words, the imaging device may obtain coordinates in the camera coordinate system corresponding to the view ② with respect to first pixel values of the view ①. The imaging device may project all first pixel values onto a plane of a candidate depth in operation 691 and may re-project the projected first pixel values to a camera coordinate system of the other imaging lens in operation 692.

Based on the above-described projection result, the imaging device may calculate an intensity difference between pixel values in pixel coordinates of the same plane. The imaging device may calculate an intensity difference between pixel values for each pixel coordinate of an image plane. For example, the imaging device may search for a first pixel value and a second pixel value corresponding to each other in individual coordinates from the same coordinate system (e.g., the camera coordinate system of the other imaging lens). The second pixel value may include pixel values based on the other imaging lens (e.g., an imaging lens corresponding to the view ②). When coordinates of a first pixel projected to the camera coordinate system of the other imaging lens are non-integer coordinates, the imaging device may determine pixel coordinates of the first pixel as adjacent integer coordinates. The imaging device may calculate an intensity difference, in an image plane, between the first pixel values that are re-projected and second pixel values corresponding to the other imaging lens.

The imaging device may calculate an intensity difference between a first pixel value and a second pixel value corresponding to each other as a SAD value, based on a projection result. The imaging device may sum all intensity differences between pixel values of the view ① and pixel values of the view ②. If a subject is at a currently selected candidate depth, a corresponding SAD may have a minimum value. Otherwise, the SAD value may not have the minimum value. The imaging device may calculate a SAD value while changing a candidate depth.

The imaging device may calculate SAD values for the plurality of candidate depths 620. The imaging device may determine a depth having a minimum SAD value among the plurality of candidate depths 620 as a target depth plane or a scene depth plane. The scene depth plane may be a plane of a depth at which a depth of field of an imaging lens needs to be formed through autofocusing. For example, a SAD value at each candidate depth may be calculated as shown in Equation 2 below.

$$D_h = \sum_{i=1}^{HW} |V_{①}(x_i) - V_{②}(x_j)| \qquad \text{[Equation 2]}$$

In Equation 2, $V_{①}(x_i)$ denotes a pixel value (e.g., an intensity value) at a position $x_i$ of the view ①. $x_i$ denotes pixel coordinates (e.g., coordinates complying with the camera coordinate system of the view ②) at which a pixel, at a position $x_i$ in the view ①, is positioned in the view ②. H denotes a height of an image, and W denotes a width of the image. In addition, h denotes a candidate depth. A target depth plane h' may be calculated as shown in Equation 3 below.

$$h' = \underset{h=0\sim\infty}{\operatorname{argmin}} D_h \qquad \text{[Equation 3]}$$

In the example shown in FIG. 6, the imaging device may repeatedly perform the above-described operations on a pair of views ① and ③, and a pair of views ① and ④ in the same manner as described above. The imaging device may calculate target depth planes $h'_{①\rightarrow②}$, $h_{①\rightarrow③}$, and $h_{①\rightarrow④}$ with minimized SAD values for each of target views 612. The imaging device may determine a depth, at which a statistical value (e.g., a mean value, and a median value) of three target depth planes or a corresponding SAD value is minimized, as a scene depth plane.

Figure 7:
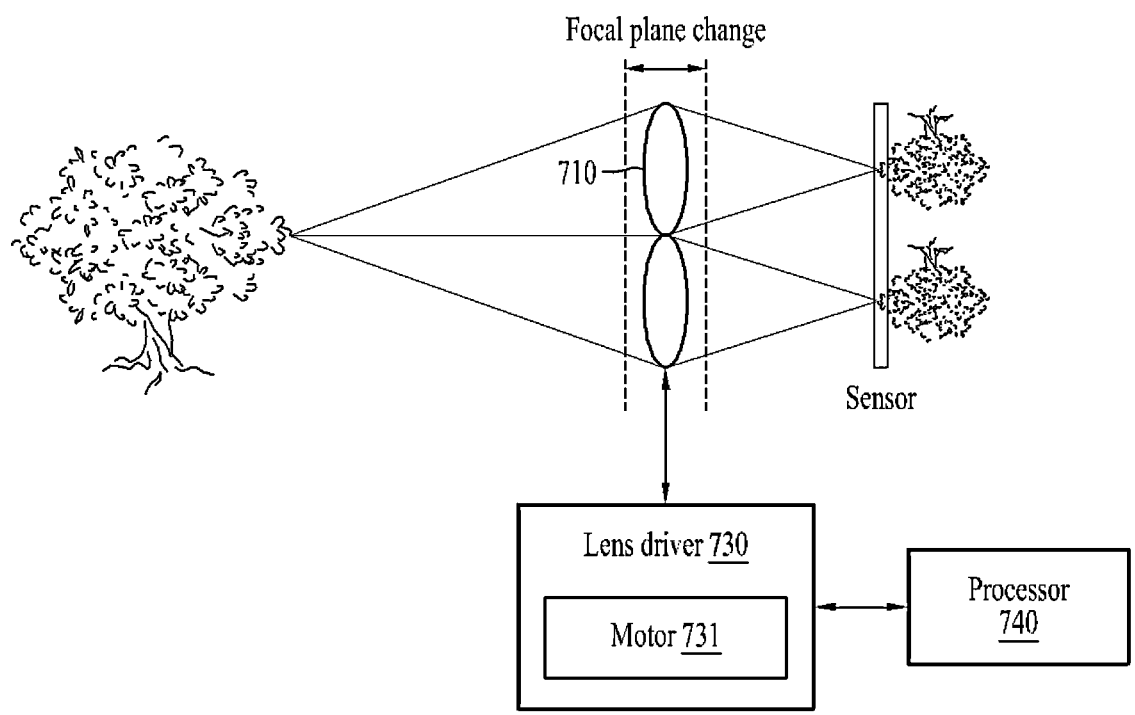
FIG. 7 illustrates an example of driving an imaging lens array according to an embodiment.

FIG. 7 illustrates an example of driving an imaging lens array according to an embodiment.

A processor 740 (e.g., a processor 1440 of FIG. 14) of an imaging device in some embodiments may determine a point to which an imaging lens array 710 is to be moved, based on focus calibration information indicating a relationship between an object distance corresponding to a determined scene depth plane and a position of the imaging lens array 710 in an optical system. As described above with reference to FIG. 4, the focus calibration information may include a mapping relationship between an object distance and a point on an optical axis of an imaging lens corresponding to the object distance. A focus on a subject within a depth of field based on the object distance may be formed within a depth of focus corresponding to the depth of field. In the focus calibration information, each object distance may be mapped to a point on the optical axis within a depth of focus corresponding to a depth of field including a corresponding object distance. The processor 740 may search for an object distance corresponding to a scene depth plane from the focus calibration information and/or determine the object distance.

The processor 740 may move an imaging lens to a point mapped to the object distance corresponding to the scene depth plane. For example, the processor 740 may move the imaging lens array 710 to a determined point along the optical axis, using a lens driver 730. The imaging lens array 710 may be moved by a motor 731 of the lens driver 730. Accordingly, the imaging lens array 710 may be moved to a point at which a clear image of a subject is formed.

Figure 8:
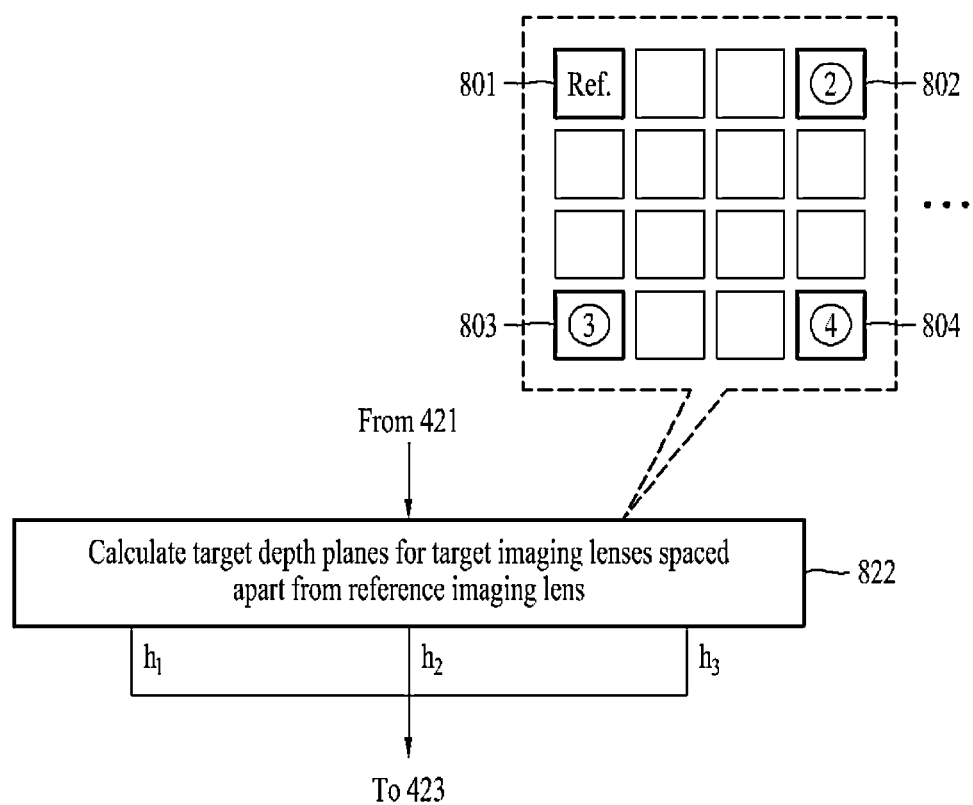
FIG. 8 illustrates an example of comparing pixels between a portion of target views and a reference view according to an embodiment.

FIG. 8 illustrates an example of comparing pixels between a portion of target views and a reference view according to an embodiment.

In operation 822, an imaging device may calculate target depth planes for target imaging lenses that are spaced apart from a reference imaging lens. A target imaging lens may be spaced apart from the reference imaging lens on a plane (e.g., a plane in which imaging lenses are arranged) of an imaging lens array. A processor of the imaging device may compare reference pixel values and target pixel values that are based on a target imaging lens spaced farthest along one axis from the reference imaging lens among a plurality of target imaging lenses. For example, in FIG. 8, an imaging lens corresponding to view ① 801 may be set as the reference imaging lens. View ② 802 may be a view based on a target imaging lens that is spaced farthest along a horizontal axis from the reference imaging lens. View ③ 803 may be a view based on a target imaging lens that is spaced farthest along a vertical axis from the reference imaging lens. View® 804 may be a view based on a target imaging lens that is spaced farthest along a diagonal axis from the reference imaging lens. The processor may compare pixels of a portion of target views (e.g., three target views) among "$N^2-1$" target views to pixels of the reference view. The imaging device may calculate target depth planes $h_1$, $h_2$, and $h_3$ based on a comparison of pixels between a portion of the target views and the reference view. Accordingly, a number of operations may be reduced in comparison to when all the "$N^2-1$" target views are compared to the reference view.

Figure 9:
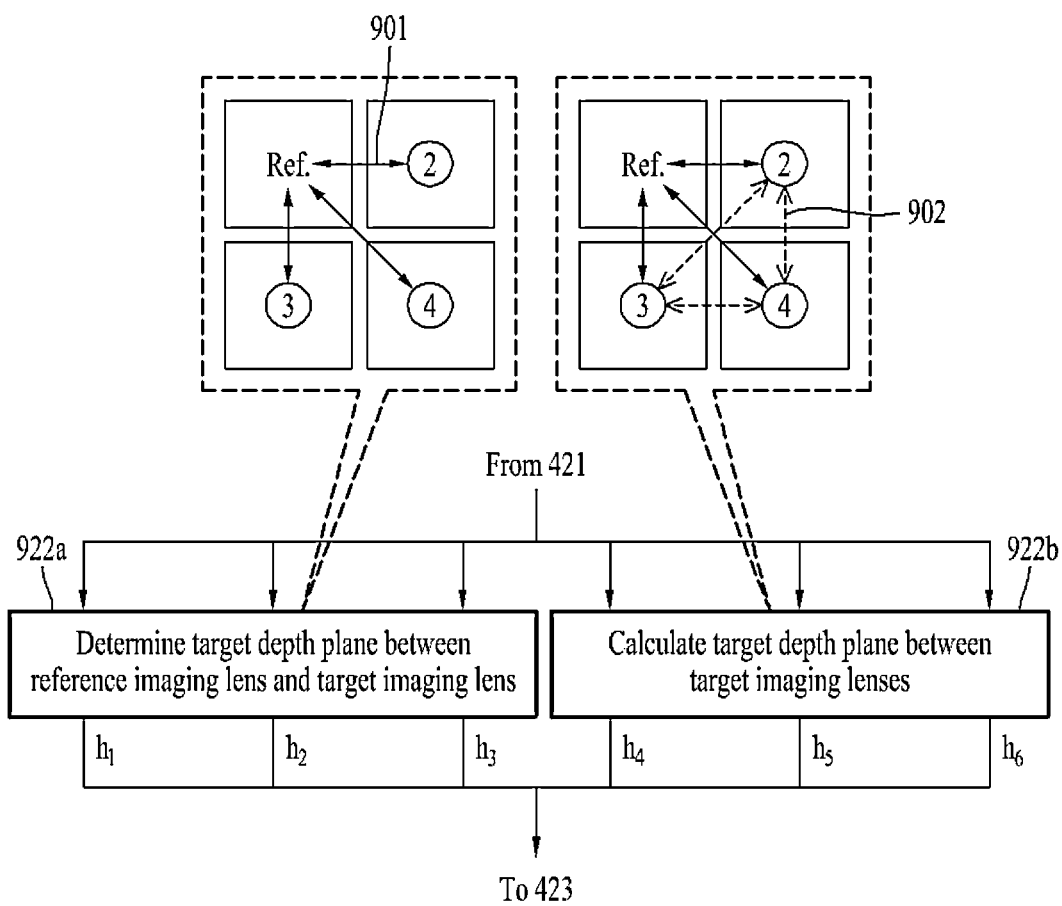
FIG. 9 illustrates an example of comparing target views to each other according to an embodiment.

FIG. 9 illustrates an example of comparing target views to each other according to an embodiment.

An imaging device in some embodiments may perform a pixel comparison 901 between a reference view and a target view, and a pixel comparison 902 between target views.

For example, in operation 922*a*, the imaging device may determine a target depth plane between a reference imaging lens and a target imaging lens. For example, as described above with reference to operation 422 of FIG. 4, the imaging device may calculate target depth planes $h_1$, $h_2$, and $h_3$, based on a comparison result between reference pixel values that are based on the reference imaging lens and target pixel values that are based on the target imaging lens. The imaging device may perform a comparison between views ① and ②, a comparison between views ① and ③, and a comparison between views ① and ④.

In operation 922*b*, the imaging device may calculate a target depth plane between target imaging lenses. A processor of the imaging device may further perform a comparison between first target pixel values that are based on a first target imaging lens among a plurality of target imaging lenses and second target pixel values that are based on a second target imaging lens. In FIG. 9, view ① may be set as a reference view in a 2×2 array structure. The imaging device may perform a pixel comparison between views ② and ③, a pixel comparison between views ② and ④, and a pixel comparison between views ③ and ④, and may calculate target depth planes $h_4$, $h_5$, and $h_6$ based on comparison results. Since a number of target depth planes used to determine a scene depth plane increases, an accuracy may increase.

For reference, for the pixel comparison 902 between the target views in operation 922*b* described above, pixels of two target views may need to be projected onto the same image plane. As described above with reference to FIG. 4, the imaging device may project pixels from one target view to another target view (e.g., from the view ② to the view ③), however, the embodiments are not limited thereto. For example, the imaging device may also reuse a previously projected result instead of projecting pixels every time, for the pixel comparison 902 between the target views. For example, the processor may project first target pixel values and second target pixel values onto an image plane corresponding to the reference imaging lens and store the projected first target pixel values and second target pixel values, for a comparison with reference pixel values. The imaging device may calculate an intensity difference between the first target pixel values and the second target pixel values in the image plane corresponding to the reference imaging lens.

Figure 10:
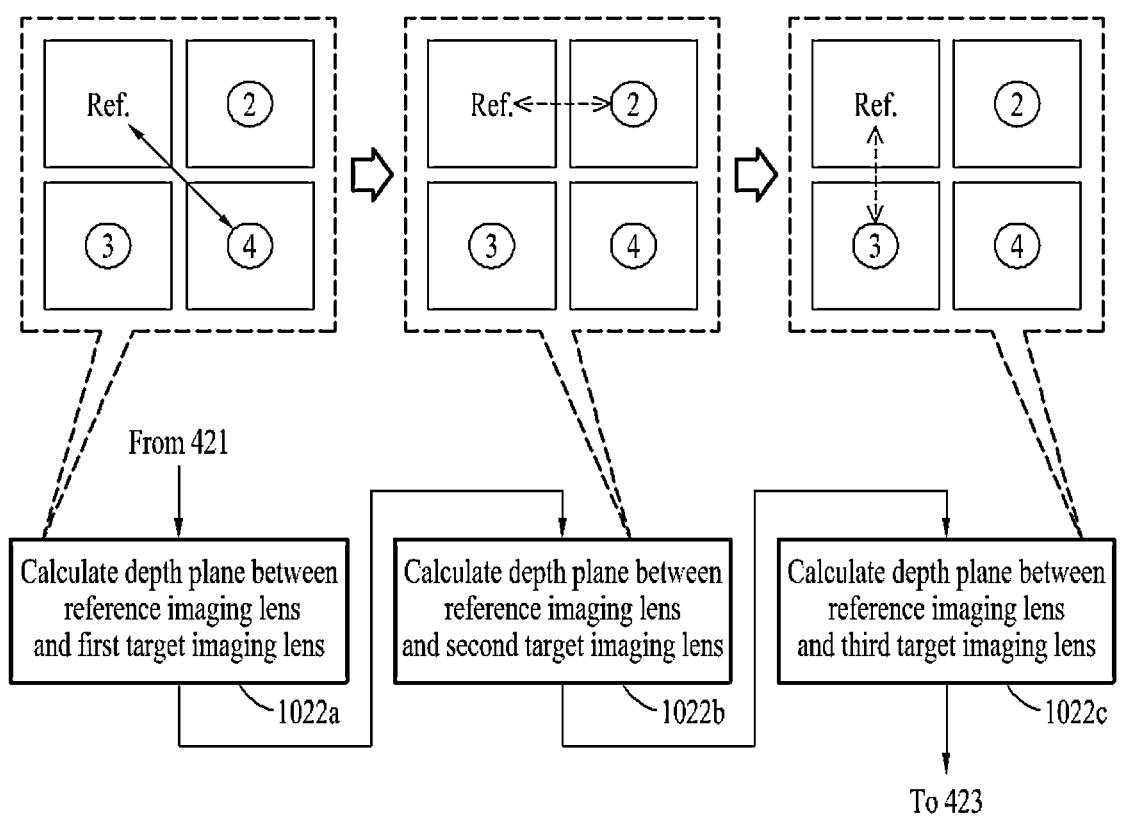
FIG. 10 illustrates an example of calculating and adjusting a depth plane according to an embodiment.

FIG. 10 illustrates an example of calculating and adjusting a depth plane according to an embodiment.

An example in which target depth planes are calculated in parallel has been described with reference to FIGS. 8 and 9. In FIG. 10, target depth planes may be calculated in series and finely tuned.

For example, in operation 1022*a*, an imaging device may calculate a depth plane between a reference imaging lens and a first target imaging lens. For example, a processor of the imaging device may determine a target depth plane based on a comparison result between reference pixel values and first target pixel values that are based on the first target imaging lens spaced apart along a first axis from the reference imaging lens among a plurality of target imaging lenses. In FIG. 10, the first axis may be a diagonal axis, and the first target imaging lens may be a lens corresponding to view ④ spaced farthest along the diagonal axis from the reference imaging lens (e.g., a lens corresponding to view ①).

In operation 1022*b*, the imaging device may calculate a depth plane between the reference imaging lens and a second target imaging lens. For example, the imaging device may determine a scene depth plane by adjusting the target depth plane based on a comparison result between the reference pixel values and second target pixel values that are based on the second target imaging lens spaced along a second axis from the first target imaging lens. In FIG. 10, the second axis is illustrated as a horizontal axis, and the second target imaging lens may be a lens corresponding to view ②. The imaging device may perform a comparison between the second target pixel values and the reference pixel values for candidate depths adjacent to the target depth plane based on the target depth plane determined in operation 1022*a*. When the second target imaging lens and the reference imaging lens are compared, the imaging device may search for a target depth plane for a portion of the candidate depths instead of searching for all candidate depths, to reduce a number of operations. A portion of the candidate depths may be selected as a predetermined number of depths according to an order of distances corresponding to the candidate depths adjacent to the target depth plane determined in operation 1022*a* among all the candidate depths. The imaging device may update a plane corresponding to a candidate depth with a smallest intensity difference between the second target pixel values and the reference pixel values among the candidate depths adjacent to the target depth plane to the scene depth plane.

In operation 1022*c*, the imaging device may calculate a depth plane between the reference imaging lens and a third target imaging lens. The imaging device may perform an update of the scene depth plane with respect to the third axis, similarly to operation 1022b. The third axis may be different from the first axis and the second axis, and is illustrated as a vertical axis in FIG. 10. The third target imaging lens is illustrated as a lens corresponding to view ③. The imaging device may perform a comparison between third target pixel values (e.g., pixel values corresponding to the third target imaging lens) and the reference pixel values for candidate depths adjacent to the depth plane updated in operation 1022b. The imaging device may update the scene depth plane based on a comparison result between pixels.

Accordingly, the imaging device may first calculate a depth plane autofocused in one direction (e.g., a diagonal direction) of an imaging lens array, and may tune the depth plane in another direction (e.g., a horizontal direction or a vertical direction). A calculation order described with reference to FIG. 10 is merely an example and may vary depending on a design. For example, a depth plane may be calculated first for a horizontal axis direction or a vertical axis direction, instead of a diagonal direction. The depth plane may be tuned with respect to the horizontal axis direction based on the calculation for the horizontal axis direction or the vertical axis direction.

The imaging device may perform an additional search based on a previously determined depth plane in the example of FIG. 10, and thus autofocusing may be performed at an increased speed.

For reference, examples of the operations of FIG. 4 have been described with reference to FIGS. 8, 9, and 10. The operations of FIGS. 8, 9, and 10 may be selectively performed, but are not limited thereto. The imaging device may also perform at least one of the operations of FIG. 8, 9, or 10 in parallel or time series as the operations of FIG. 4.

Figure 11:
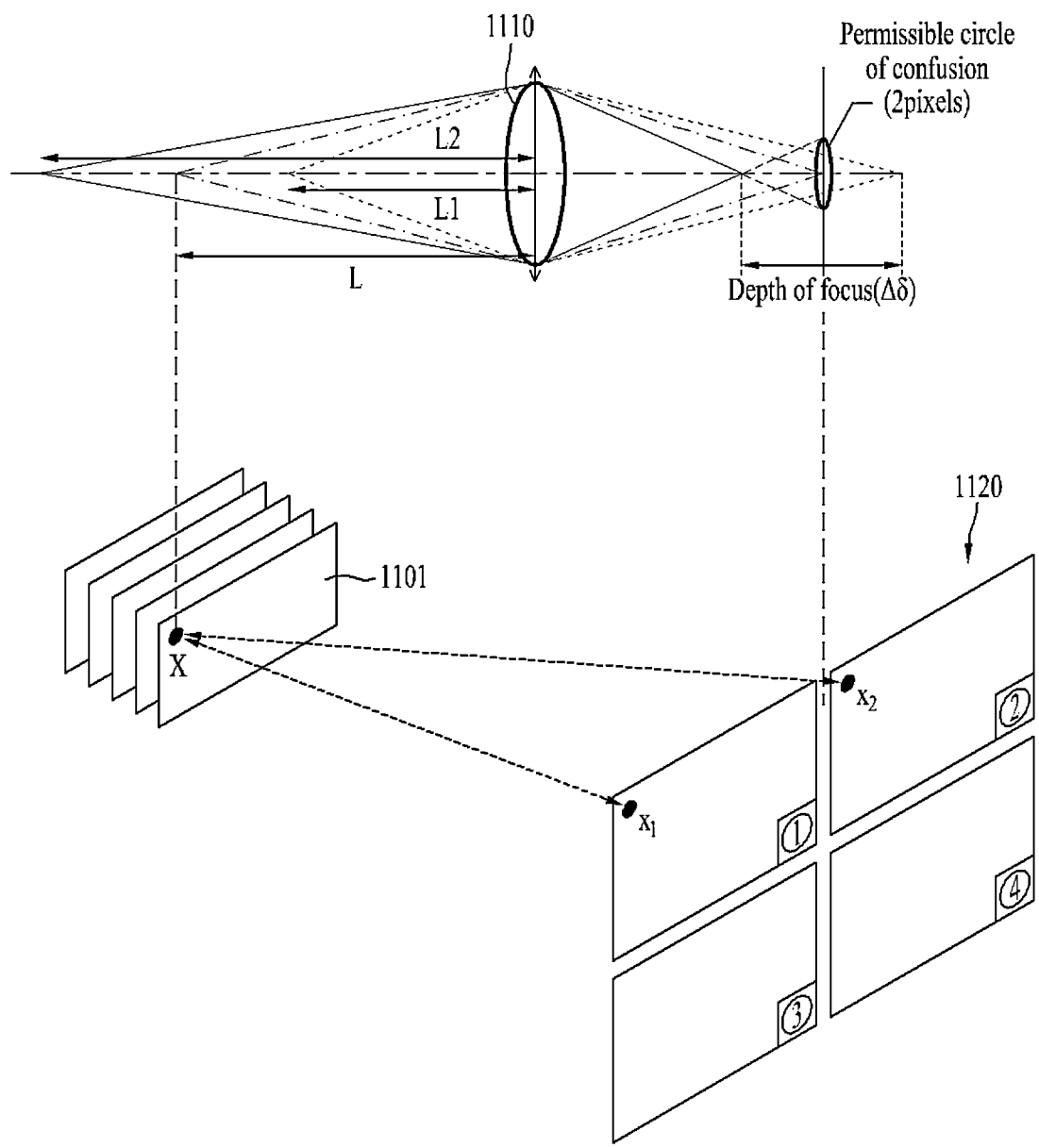
FIG. 11 illustrates a selection of a candidate depth and a focus calibration according to an embodiment.

FIG. 11 illustrates a selection of a candidate depth and a focus calibration according to an embodiment.

A plurality of candidate depths 1101 may be depths selected from a range of a target to be captured between a minimum capturing distance (e.g., 10 centimeters (cm)) and an infinite distance (e.g., a hyperfocal distance). For example, the plurality of candidate depths 1101 may be selected to have a near point distance and a far point distance. The near point distance and the far point distance are described with reference to Equations 4 and 5 shown below.

$$L1 = \frac{(L-f) \times L \times \Delta\delta}{(f^2 + (L-f) \times \Delta\delta)} \quad \text{[Equation 4]}$$

$$L2 = \frac{(L-f) \times L \times \Delta\delta}{(f^2 - (L-f) \times \Delta\delta)} \quad \text{[Equation 5]}$$

In Equations 4 and 5, L denotes an object distance, $f$ denotes a focal length of an imaging lens 1110, $\Delta\delta$ denotes a depth of focus, L1 denotes a near point distance, and L2 denotes a far point distance. The near point distance L1 may be a distance from the imaging lens 1110 to a near point in the depth of field, and the far point distance L2 may be a distance from the imaging lens 1110 to a far point in the depth of field. The depth of focus $\Delta\delta$ may be an image sensor-side range in which a focus corresponding to the depth of field is formed, as described above, and may be expressed as shown in Equation 6 below.

$$\Delta\delta = Fno \times p \cdot CoC \quad \text{[Equation 6]}$$

$$Fno = \frac{f}{D} \quad \text{[Equation 7]}$$

In Equation 6, the depth of focus $\Delta\delta$ may be determined based on an f value Fno and a permissible circle of confusion (p.CoC). A permissible circle of confusion with a size of two pixels is described as an example. In Equation 7, D denotes a diameter of an entrance pupil of an imaging device.

Based on Equation 5 described above, near point distances and far point distances may be calculated for each of a plurality of object distances. For example, Table 1 shows a near point distance ND1 and a far point distance FD1 for a first object distance OD1, a near point distance ND2 and a far point distance FD2 for a second object distance OD2, and a near point distance ND3 and a far point distance FD3 (e.g., co) for a third object distance OD3. For reference, in Table 1, three candidate depths 1101 are described for convenience of description, however, the embodiments are not limited thereto. For example, "M" candidate depths 1101 may be selected to cover a range of a minimum capturing distance to a hyperfocal distance. "M" may be an integer greater than or equal to "3." Referring to Table 1, the plurality of candidate depths 1101 may be added between the first object distance OD1 and the third object distance OD3.

TABLE 1

| Object distance (=Candidate depth) | Near point distance | Far point distance |
|---|---|---|
| OD3 | ND3 | FD3 (∞) |
| OD2 | ND2 | FD2 |
| OD1 | ND1 (e.g., about 10 cm) | FD1 |

For example, the plurality of candidate depths 1101 may be set such that a depth of field based on an object distance corresponding to each of the plurality of candidate depths 1101 may at least partially overlap a depth of field corresponding to another candidate depth. The depth of field based on the object distance corresponding to each of the candidate depths 1101 may have a near point distance and a far point distance. As described above, the near point distance and the far point distance may be determined based on a permissible circle of confusion and a focal length of an imaging lens array with respect to an object distance corresponding to at least one of the plurality of candidate depths 1101. The plurality of candidate depths 1101 may be selected such that a range in which depths of field corresponding to the plurality of candidate depths 1101 are combined may cover a range of the minimum capturing distance to an optically infinite distance.

A near point distance may be within a range of depths of field corresponding to other candidate depths. For example, the second near point distance ND2 for the second object distance OD2 may be less than the first far point distance FD1 for the first object distance OD1. Similarly, a far point distance may also be within the range of depths of field corresponding to the other candidate depths. For example, the second far point distance FD2 for the second object distance OD2 may be less than the third near point distance ND3 for the third object distance OD3. In other words, a depth of field for the second object distance OD2 may at least partially overlap each of a depth of field for the first object distance OD1 and a depth of field for the third object distance OD3. A far point distance determined based on an imaging lens array (e.g., a focal length of each imaging lens 1110) and an object distance corresponding to one candidate depth may be an infinite distance. In an example, a far point distance of the third object distance OD3 farthest among object distances may be an optically infinite distance. A candidate depth corresponding to a depth of field covering a far point distance that is an optically infinite distance may correspond to a hyperfocal distance. In another example, a near point distance of the first object distance OD1 nearest among object distances may be the minimum capturing distance (e.g., 10 cm). The minimum capturing distance may vary depending on a design.

Focus calibration information may include information on a point on an optical axis at which the imaging lens 1110 needs to be positioned for each of the selected candidate depths 1101 as described above with reference to Table 1. In the focus calibration information, the point on the optical axis at which the imaging lens 1110 needs to be positioned may be a point within a depth of focus corresponding to a depth of field of a corresponding candidate depth and may be determined by, for example, an experiment or test, however, the embodiments are not limited thereto. For example, when the imaging lens 1110 is moved to a point corresponding to the first object distance OD1, the imaging device may focus on a subject positioned within a range of a depth of field greater than or equal to the first near point distance ND1 and less than the first far point distance FD1. The imaging device may form focal points of rays passing through a corresponding imaging lens 1110 on an image plane 1120. The plurality of candidate depths 1101 and focus calibration information corresponding to the candidate depths 1101 may be determined and generated based on optical specifications (e.g., a focal length, a permissible circle of confusion, etc.) of the imaging lens 1110.

Figure 12:
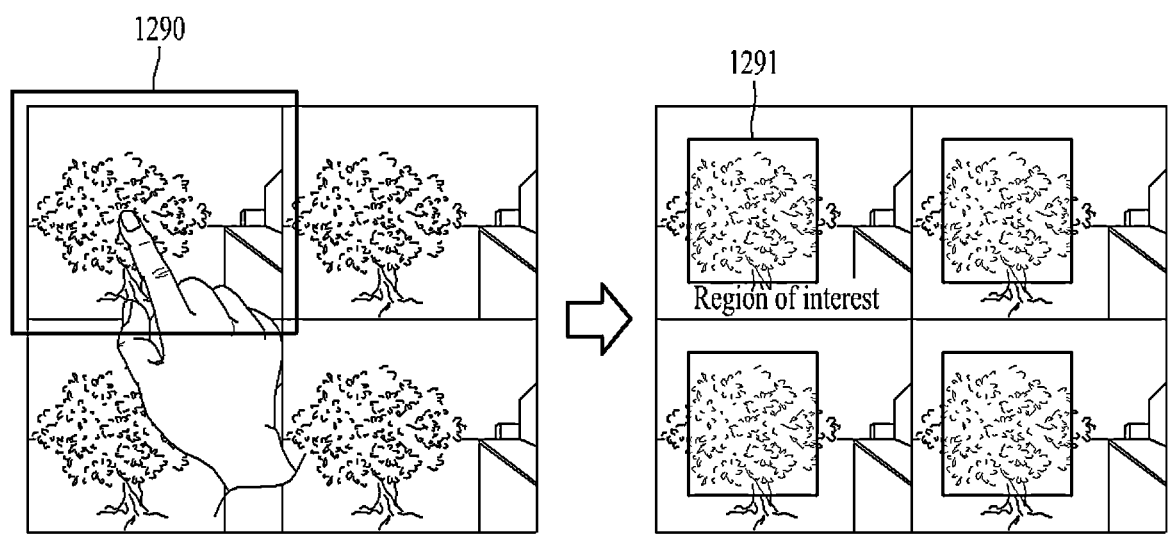
FIG. 12 is a diagram illustrating a comparison of pixel values based on a selected region of interest (ROI) according to an embodiment.

FIG. 12 is a diagram illustrating a comparison of pixel values based on a selected region of interest (ROI) according to an embodiment.

An imaging device in some embodiments may set a ROI 1291 in response to a user input. For example, the imaging device may output a preview image 1290 using a display (e.g., a touch display). The imaging device may generate the preview image 1290 based on sensing information sensed by sensing elements of a sensing region corresponding to one imaging lens (e.g., a reference imaging lens set as a reference view) among a plurality of imaging lenses. The imaging device may set the ROI 1291 based on a point selected based on an input to select one point from the preview image 1290. Based on the ROI 1291 set for an image (e.g., a preview image) corresponding to one view (e.g., a reference view), the imaging device may equally set ROIs 1291 for images corresponding to other views. The imaging device may determine a scene depth plane based on a result obtained by comparing pixel values corresponding to the set ROI 1291 among pixel values of each of the plurality of imaging lenses.

For example, the imaging device may compare pixel values belonging to the ROI 1291, instead of using all pixel values of each sensing region corresponding to each of the imaging lenses. Accordingly, the imaging device may form a focal point based on the ROI 1291, to clearly capture a subject desired by a user. In addition, the imaging device may determine a scene depth plane corresponding to a subject with a relatively small number of operations.

Figure 13:
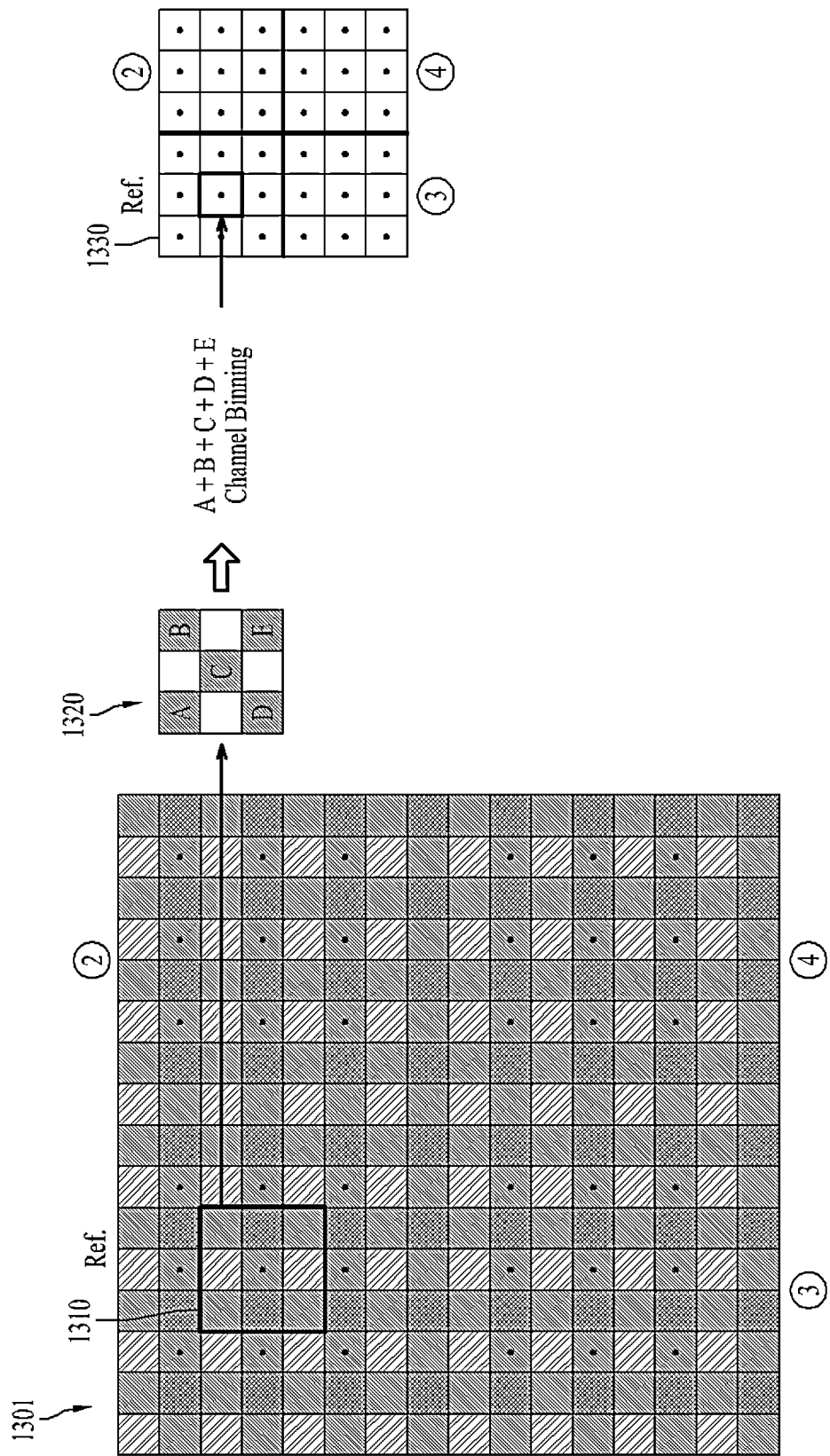
FIG. 13 is a diagram illustrating an example of using a pixel value in which sensing values are grouped in units of blocks, according to an embodiment.

FIG. 13 is a diagram illustrating an example of using a pixel value in which sensing values are grouped in units of blocks, according to an embodiment.

An imaging device in some embodiments may determine reference pixel values by grouping values sensed by sensing elements corresponding to a reference imaging lens in a predesignated block unit 1310 (e.g., 3×3 blocks). For example, a controller (not shown) of an image sensor 1301 may group sensing elements arranged in each sensing region in the block unit 1310 determined based on an illuminance. A size of the block unit 1310 may be determined in advance for each illuminance. If the illuminance increases, the size of the block unit 1310 may decrease, and if the illuminance decreases, the size of the block unit 1310 may increase. An operation of determining a pixel value of each pixel by merging sensing values for each block unit 1310 may also be referred to as "digital binning." The controller may group reference sensing elements (e.g., sensing elements covered by the reference imaging lens) based on a binning size determined based on an illuminance. The imaging device and/or the imaging sensor 1301 may group sensing elements into block units 1310 based on binning reference points that are indicated by black dots • in FIG. 13, for example. For example, the imaging device and/or the image sensor 1301 may set a portion of sensing elements for sensing green as a binning reference point.

The controller may generate sensing data based on a sensing of the grouped sensing elements. The controller may generate sensing data based on an intensity of light sensed by the grouped sensing elements. The sensing data may include a partial image for each sensing region and/or intensity information for the partial image. The imaging device and/or the imaging sensor 1301 may determine a pixel value corresponding to a binning reference point based on sensing values 1320 of green sensing elements in the block unit 1310 set based on an individual binning reference point. FIG. 13 illustrates an example in which a pixel value is determined by summing green sensing values A, B, D, and E based on a binning reference point C. Accordingly, the imaging device and/or the image sensor 1301 may obtain a partial image having pixel values merged based on the above-described block unit 1310 for each sensing region corresponding to each imaging lens. A set of reference pixel values obtained based on digital binning may represent a reference partial image 1330. The imaging device and/or the image sensor 1301 may perform a comparison between partial images obtained for each view as described above with reference to FIGS. 1 to 12. Similarly, the imaging device may determine target pixel values by grouping values sensed by sensing elements corresponding to a target imaging lens in the block unit 1310. A set of the target pixel values may represent a target partial image.

Accordingly, the imaging device and/or the image sensor 1301 may determine a scene depth plane based on pixel values obtained through digital binning of sensing values of the same channel (e.g., a green channel) even in a noisy environment such as a low-illuminance environment.

Figure 14:
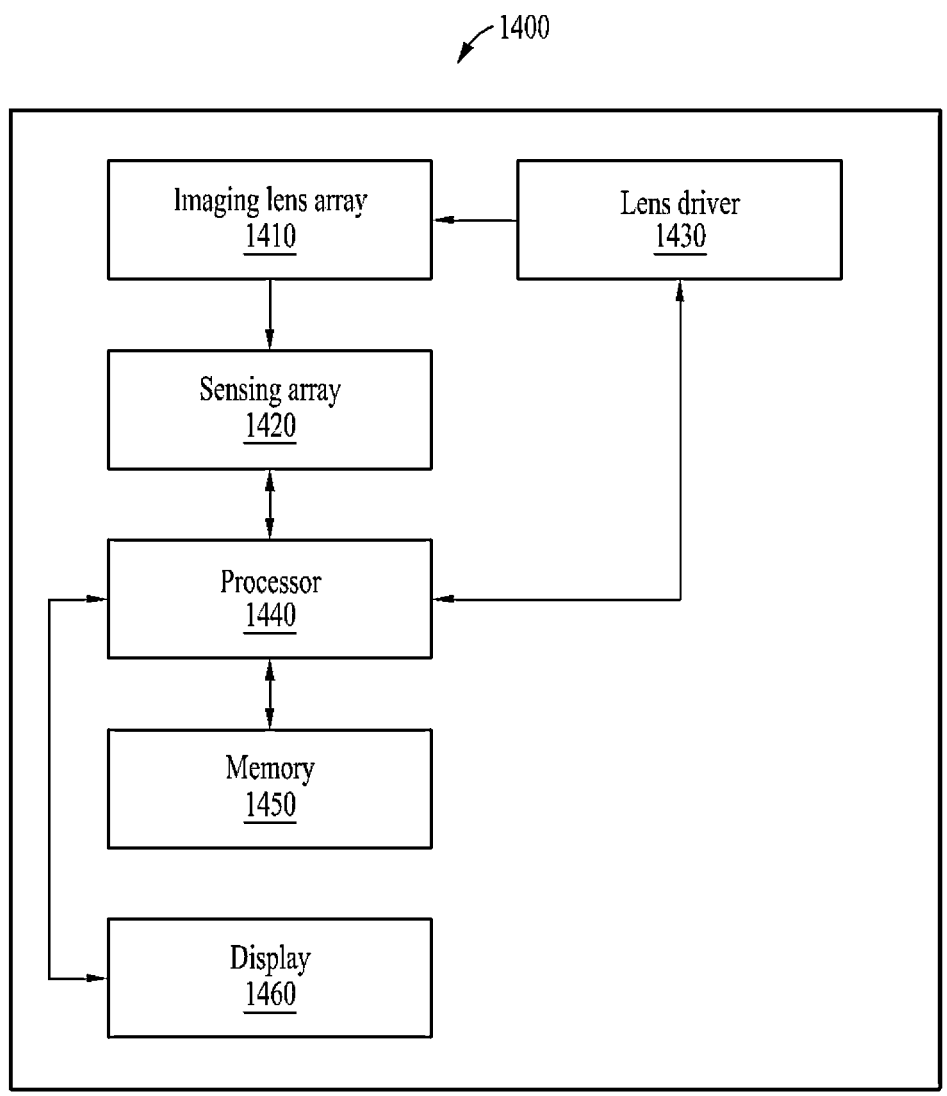
FIG. 14 is a block diagram illustrating an example of a configuration of an imaging device.

FIG. 14 is a block diagram illustrating an example of a configuration of an imaging device according to an embodiment.

An imaging device 1400 may include an imaging lens array 1410, a sensing array 1420, a lens driver 1430, the processor 1440, a memory 1450, and a display 1460.

The imaging lens array 1410 may include imaging optical lenses that transfer light received from an external device. The imaging lens array 1410 may be driven by the lens driver 1430. The lens driver 1430 may include a mechanical mechanism that connects a motor to allow the imaging lens array 1410 to move along an optical axis, and the motor configured to allow the imaging lens array 1410 to move by transferring power to the above-described mechanical mechanism. The sensing array 1420 may include sensing elements for each sensing region corresponding to imaging lenses. The sensing array 1420 may be included in an image sensor. The processor 1440 may perform autofocusing based on sensing information sensed by sensing elements. For example, the processor 1440 may determine a scene depth plane based on an intensity difference between pixel values of a plurality of views by performing at least one of the operations described above with reference to FIGS. 1 to 13, and may move the imaging lens array 1410 to a point corresponding to the determined scene depth plane. For reference, the processor 1440 illustrated in FIG. 14 may be an application processor (AP) 1440, but is not limited thereto. Since the imaging lens array 1410, the sensing array 1420, the lens driver 1430, and the processor 1440 have been described above, further description thereof may not be provided herein.

The memory 1450 may temporarily or semipermanently store data used to perform autofocusing. For example, the memory 1450 may store any one or any combination of sensing values sensed by respective sensing elements, pixel values determined based on the sensing values, or partial images determined based on the pixel values. The memory 1450 may store focus calibration information including information on a plurality of candidate depths selected in advance and a point on the optical axis corresponding to each of the candidate depths. The memory 1450 may also store lens calibration information for a camera unit for each imaging lens.

The display 1460 may output a preview image corresponding to one of a plurality of imaging lenses. The display 1460 may also output a result captured at the scene depth plane determined by autofocusing. For example, the processor 1440 may obtain captured partial images from the scene depth plane for each sensing region. The processor 1440 may restore a high-resolution image based on a result obtained by rearranging or shuffling the obtained partial images. The processor 1440 may output a high-resolution output image restored from the partial images, using the display 1460.

An image sensor and/or the imaging device 1400 may be applied to various technical fields. Since a lens array including a plurality of lenses and a sensor including a plurality of sensing elements may be designed to be spaced apart by a relatively short focal length, the imaging device 1400 may be implemented as an ultra-thin camera that has a relatively large sensor and a small thickness and that enables high-quality capturing.

The image sensor and/or the imaging device 1400 may be mounted on a mobile terminal. The mobile terminal may be a movable terminal that is not fixed at an arbitrary position, and may include, for example, a portable device, such as a smartphone, a tablet, or a foldable smartphone, an artificial intelligence speaker, a vehicle, and the like.

The imaging device 1400 may be applied to a front camera or a rear camera of a smartphone. The imaging device 1400 may have a structure in which a large-sized full frame sensor is coupled to a multi-lens array, and may be applied to a smartphone camera.

In addition, the imaging device 1400 may be implemented in a vehicle, with a thin structure or a curved structure. The imaging device 1400 may be implemented in a vehicle as a front camera or a rear camera having a curved shape. In addition, the imaging device 1400 may be applicable to a field such as a digital single-lens reflex (DSLR) camera, a drone, a closed-circuit television (CCTV) camera, a webcam camera, a panoramic camera, a movie or broadcast video camera, and a virtual reality/augmented reality (VR/AR) camera, a flexible/stretchable camera, a compound-eye camera, and a contact lens type camera. Furthermore, the imaging device 1400 may also be applied to a multi-frame super-resolution image restoration to increase a resolution based on information on a plurality of captured frames.

The imaging device 1400 may perform autofocusing without a structure for detecting a phase difference. The imaging device 1400 may quickly perform autofocusing even in an environment in which noise is generated. The imaging device 1400 may change focusing on a target object (e.g., a subject) at a high speed. High-speed processing may be possible. Since a separate phase difference detection element is unnecessary, an image with an improved image quality may be obtained from the same area. In addition, although a phase difference may be calculated only in a horizontal direction by a phase difference detection element, the imaging device 1400 may calculate information (e.g., an intensity difference between corresponding pixels) corresponding to a phase difference in the horizontal direction, a vertical direction, and a diagonal direction, to have an enhanced accuracy of focusing. The imaging device 1400 may determine a scene depth plane based on a higher resolving power, by comparing pixels between views having a relatively great disparity.

For reference, although the processor 1440 is illustrated as a separate module from the image sensor in FIG. 14, the embodiments are not limited thereto. The image sensor and the processor 1440 may also be integrally implemented. The image sensor may be, for example, a sensor that senses light passing through the lens array 1410. The image sensor may include the sensing array 1420, a controller (not shown), and the processor 1440. The processor 1440 of the image sensor may also be referred to as an "image signal processor (ISP) 1440." In addition, although the processor 1440 is included in the imaging device 1400 as illustrated in FIG. 14, the embodiments are not limited thereto. In an example, the imaging device 1400 may also use a processor 1440 of an external device.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

What is claimed is:

1. An imaging device comprising:
    an imaging lens array comprising a plurality of imaging lenses each with a same focal length, the plurality of imaging lenses being configured to capture a scene;
    a sensing array comprising a plurality of sensors configured to receive light passing through the plurality of imaging lenses;
    a processor configured to determine a scene depth plane corresponding to the scene based on a comparison, for each of a plurality of candidate depths, between reference pixel values that are based on first sensors of the plurality of sensors corresponding to a reference imaging lens of the plurality of imaging lenses and target pixel values that are based on second sensors of the plurality of sensors corresponding to a target imaging lens of the plurality of image lenses; and
    a lens driver configured to position the imaging lens array to be disposed at a point corresponding to the determined scene depth plane.

2. The imaging device of claim 1, wherein the processor being configured to determine the scene depth plane includes being configured to:
    project the reference pixel values and the target pixel values onto a plane with a same depth; and
    calculate an intensity difference between pixel values in pixel coordinates of the plane with the same depth.

3. The imaging device of claim 1, wherein the processor being configured to determine the scene depth plane includes being configured to:
    project pixel values corresponding to one of the reference imaging lens or the target imaging lens onto an image plane corresponding to another of the reference imaging lens or the target imaging lens; and
    calculate an intensity difference between pixel values for each pixel coordinate of the image plane.

4. The imaging device of claim 1, wherein the processor being configured to determine the scene depth plane includes being configured to:
    project first pixel values corresponding to one of the reference imaging lens or the target imaging lens onto a plane of each of the plurality of candidate depths;
    re-project the first pixel values, projected onto the plane of the corresponding candidate depth of the plurality of candidate depths, onto an image plane corresponding to another of the reference imaging lens or the target imaging lens; and
    calculate an intensity difference, in the image plane, between the re-projected first pixel values and second pixel values corresponding to the other of the reference imaging lens or the target imaging lens.

5. The imaging device of claim 1, wherein the processor being configured to determine the scene depth plane includes being configured to:
    calculate an intensity difference between the reference pixel values and the target pixel values for each of the plurality of candidate depths; and
    determine the scene depth plane based on the intensity difference calculated for each of the plurality of candidate depths.

6. The imaging device of claim 1,
    wherein the plurality of imaging lens includes one or more additional target imaging lenses;
    wherein the processor being configured to determine the scene depth plane includes being configured to:
        determine a target depth plane corresponding to each of the target imaging lens and the one or more additional target imaging lenses, each of the target depth planes being based on a result obtained by (i) comparing the reference pixel values and the target pixel values, or (ii) comparing the reference pixel values and additional target pixel values that are based on the corresponding additional target imaging lens of the one or more additional target imaging lenses; and
        determine the scene depth plane based on the determined target depth planes.

7. The imaging device of claim 1, wherein the processor is further configured to perform a comparison between the reference pixel values and target pixel values that are based on a target imaging lens spaced farthest along one axis from the reference imaging lens among a plurality of target imaging lenses.

8. The imaging device of claim 1,
    wherein the target imaging lens is a first target imaging lens,
    wherein the target pixel values are first target pixel values, and wherein the processor is further configured to perform a comparison between the first target pixel values and second target pixel values that are based on a second target imaging lens.

9. The imaging device of claim 8, wherein the processor being configured to determine the scene depth plane includes being configured to:
  project the first target pixel values and the second target pixel values onto an image plane corresponding to the reference imaging lens for a comparison with the reference pixel values; and
  calculate an intensity difference between the first target pixel values and the second target pixel values in the image plane.

10. The imaging device of claim 1,
  wherein the target imaging lens is a first target imaging lens spaced farthest along a first axis from the reference imaging lens among a plurality of target imaging lenses,
  wherein the target pixel values are first target pixel values, and
  wherein the processor being configured to determine the scene depth plane includes being configured to:
    determine a target depth plane based on a comparison result between the reference pixel values and first target pixel values; and
    determine the scene depth plane by adjusting the target depth plane based on a comparison result between the reference pixel values and second target pixel values that are based on a second target imaging lens among the plurality of target imaging lenses spaced farthest along a second axis from the first target imaging lens.

11. The imaging device of claim 10, wherein the processor is further configured to:
  perform a comparison between the second target pixel values and the reference pixel values for candidate depths of the plurality of candidate depths adjacent to the target depth plane based on the determined target depth plane; and
  update a plane corresponding to a candidate depth with a smallest intensity difference between the second target pixel values and the reference pixel values among the candidate depths adjacent to the target depth plane to the scene depth plane.

12. The imaging device of claim 1, wherein the plurality of candidate depths is set such that a depth of field based on an object distance corresponding to one of the plurality of candidate depths at least partially overlaps a depth of field corresponding to another candidate depth.

13. The imaging device of claim 12, wherein
  a near point distance determined based on a focal length of the imaging lens array and a permissible circle of confusion with respect to an object distance corresponding to at least one of the plurality of candidate depths is within a range of the depth of field corresponding to the other candidate depth, and
  a far point distance determined based on the object distance corresponding to the one candidate depth and the imaging lens array is an infinite distance.

14. The imaging device of claim 1, wherein the processor is further configured to:
  set a region of interest (ROI) in response to a user input; and
  determine the scene depth plane based on a result obtained by comparing pixel values corresponding to the set ROI among pixel values for each of the plurality of imaging lenses.

15. The imaging device of claim 1, wherein the processor is further configured to:
  determine the reference pixel values by grouping values sensed by the sensors corresponding to the reference imaging lens in a first predesignated block unit; and
  determine the target pixel values by grouping values sensed by the sensors corresponding to the target imaging lens in a second predesignated block unit.

16. The imaging device of claim 1, wherein the processor is further configured to determine an intensity value sensed by each sensing element as a pixel value of a corresponding sensing element regardless of a color channel.

17. The imaging device of claim 1, wherein the processor is further configured to determine the point to which the imaging lens array is to be positioned, based on focus calibration information indicating a relationship between an object distance corresponding to the determined scene depth plane and a position of the imaging lens array in an optical system.

18. The imaging device of claim 1, wherein the processor is further configured to project the reference pixel values or the target pixel values onto an image plane via a plane corresponding to a candidate depth, based on an intrinsic parameter and an extrinsic parameter obtained through a camera calibration for the plurality of imaging lenses.

19. A processor-implemented method, the method comprising:
  receiving a sensor signal corresponding to light passing through a plurality of imaging lenses each with a same focal length to capture a scene from a plurality of sensors;
  determining a scene depth plane corresponding to the scene based on a comparison, for each of a plurality of candidate depths, between reference pixel values that are based on first sensors of the plurality of sensors corresponding to a reference imaging lens of the plurality of imaging lenses and target pixel values that are based on second sensors of the plurality of sensors corresponding to a target imaging lens of the plurality of image lenses; and
  transmitting a driver signal to a lens driver, the driving signal directing the lens driver to position the imaging lens array to be disposed at a point corresponding to the determined scene depth plane.

20. A non-transitory computer-readable storage medium storing instructions that, when executed by a processor, cause the processor to perform the method comprising:
  receiving a sensor signal corresponding to light passing through a plurality of imaging lenses each with a same focal length to capture a scene from a plurality of sensors;
  determining a scene depth plane corresponding to the scene based on a comparison, for each of a plurality of candidate depths, between reference pixel values that are based on first sensors of the plurality of sensors corresponding to a reference imaging lens of the plurality of imaging lenses and target pixel values that are based on second sensors of the plurality of sensors corresponding to a target imaging lens of the plurality of image lenses; and
  transmitting a driver signal to a lens driver, the driving signal directing the lens driver to position the imaging lens array to be disposed at a point corresponding to the determined scene depth plane.

* * * * *